United States Patent
Sha et al.

(10) Patent No.: US 12,089,086 B2
(45) Date of Patent: Sep. 10, 2024

(54) RESOURCE PERIODICITY CONFIGURATION METHOD AND DEVICE, LINK PROCESSING AND ESTABLISHING METHOD AND DEVICE

(71) Applicant: ZTE CORPORATION, Guangdong (CN)

(72) Inventors: Xiubin Sha, Shenzhen (CN); Bo Dai, Shenzhen (CN); Ting Lu, Shenzhen (CN); Yin Gao, Shenzhen (CN); He Huang, Shenzhen (CN); Xu Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 450 days.

(21) Appl. No.: 17/375,025

(22) Filed: Jul. 14, 2021

(65) Prior Publication Data
US 2022/0007232 A1 Jan. 6, 2022

Related U.S. Application Data

(63) Continuation of application No. PCT/CN2020/072604, filed on Jan. 17, 2020.

(30) Foreign Application Priority Data

Jan. 18, 2019 (CN) .......................... 201910049403.8

(51) Int. Cl.
*H04W 28/06* (2009.01)
*H04L 45/74* (2022.01)
*H04L 69/04* (2022.01)

(52) U.S. Cl.
CPC ............. *H04W 28/06* (2013.01); *H04L 45/74* (2013.01); *H04L 69/04* (2013.01)

(58) Field of Classification Search
CPC ............. H04W 28/06; H04W 36/0044; H04W 36/0072; H04W 4/70; H04W 8/24;
(Continued)

(56) References Cited

U.S. PATENT DOCUMENTS

2014/0369365 A1* 12/2014 Denio ..................... H04L 69/16
370/474
2018/0124648 A1 5/2018 Park et al.
(Continued)

FOREIGN PATENT DOCUMENTS

EP 2 150 018 A1 2/2010
WO WO-2009/074101 A1 6/2009

OTHER PUBLICATIONS

CATT: "Ethernet Header Compression" 3GPP TSG RAN WG2 Meeting #104; R2-1816362; Nov. 16, 2018; Spokane, USA (3 pages).
(Continued)

*Primary Examiner* — Ayaz R Sheikh
*Assistant Examiner* — David Zhijun Sun
(74) *Attorney, Agent, or Firm* — Foley & Lardner LLP

(57) ABSTRACT

Provided are a resource periodicity configuration method and device, a link processing and establishing method and device. Specifically, the resource periodicity configuration method includes: receiving, by a network side, a traffic mode and/or a clock accuracy capability reported by a user equipment (UE); and sending, by the network side, resource configuration information to the UE, where the resource configuration information carries at least one of: a periodicity factor of a configuration resource, a periodicity granularity of the configuration resource, or a periodicity length of the configuration resource; and the configuration information is used for indicating semi-persistent scheduling (SPS) traffic or configured grant (CG) traffic of the UE.

18 Claims, 15 Drawing Sheets

(58) Field of Classification Search
CPC ....... H04W 72/23; H04W 4/20; H04W 24/02; H04W 24/10; H04W 36/08; H04W 36/30; H04W 76/10; H04W 72/0446; H04W 72/51; H04L 45/74; H04L 69/04
See application file for complete search history.

(56) References Cited

U.S. PATENT DOCUMENTS

2019/0007941 A1 1/2019 Cavalcanti et al.
2019/0116521 A1* 4/2019 Qiao ................ H04L 69/04

OTHER PUBLICATIONS

CATT: "PTP 1588 support in 5GS/TSN" 3GPP TSG-RAN WG2 Meeting #104; R2-1816360; Nov. 16, 2018 (5 pages).
Ericsson: "On support for deterministic periodic traffic with configured grants" 3GPP TSG-RAN WG2 #104; R2-1817174; Nov. 16, 2018; Spokane, USA (6 pages).
International Search Report and Written Opinion for PCT Appl. No. PCT/CN2020/072604 mailed Apr. 15, 2020 (with English translation, 15 pages).
Nokia et al.: "NR support for TSN traffic patterns" 3GPP TSG-RAN WG2 Meeting #104; R2-1817270; Nov. 16, 2018; Spokane, USA (9 pages).
Nokia et al.: "Report from [104#36][NR/IIOT]TSN Traffic Patterns" 3GPP TSG-RAN WG2 Meeting #105; R2-19xxxxx; Athens, Greece; Mar. 1, 2019 (8 pages).
Ericsson, "Ethernet Header Compression" 3GPP TSG-RAN WG2 #103bis, R2-1814811, Oct. 12, 2018, Chengdu, China (5 pages).
Extended European Search Report for EP Appl. No. 20741582.9, dated Apr. 13, 2022 (10 pages).
First Office Action for IN Appl. No. 202127034682, dated May 26, 2022 *7 pages).
ZTE Corporation et al., "Ethernet header compression in TSC for NR-IIoT" 3GPP TSG-RAN2 Meeting#106, R2-1905648, May 17, 2019, Reno, Nevada (4 pages).

* cited by examiner

RESOURCE PERIODICITY CONFIGURATION METHOD AND DEVICE, LINK PROCESSING AND ESTABLISHING METHOD AND DEVICE

CROSS-REFERENCE TO RELATED APPLICATIONS

The present application claims the benefit of priority under 35 U.S.C. § 120 as a continuation of PCT Patent Application No. PCT/CN2020/072604, filed on Jan. 17, 2020, which claims priority to Chinese Patent Application No. 201910049403.8 filed with the CNIPA on Jan. 18, 2019, the disclosure of each of which is incorporated herein by reference in its entirety.

TECHNICAL FIELD

The present disclosure relates to the field of communications and, specifically, a resource periodicity configuration method and device, and a link processing and establishing method and device.

BACKGROUND

In an industrial Internet of Things (IIoT) system, the IIoT traffic generally transmits machine instructions, and the traffic delay is very sensitive, usually reaching the microsecond level. Such traffic is carried in Ethernet, and clocks between terminals are difficult to align completely.

Considering the network deployment cost and other factors, it is expected that IIoT traffic can be carried in a fifth-generation (5G) wireless system (next radio), that is, NR-IIoT is supported. The basic idea of the NR-IIoT system is to add an Ethernet adaption node at the boundary of an NR system, convert an Ethernet data packet into a data packet of the NR system, and then transmit the data packet in the NR system. Thus, the following enhancements need to be considered in the NR system.

Traffic periodicity refinement of configured grant (CG) or semi-persistent scheduling (SPS): the traffic periodicity interval in the related art is an enumerated type, and the periodicity interval cannot well match the traffic mode of Ethernet, so the traffic periodicity refinement of CG or SPS needs to be enhanced.

Resource pre-configuration of a target cell in a movement process: in the movement process of a terminal, if a CG or an SPS resource of a target cell is configured through a handover instruction, the resource configuration delay of the target cell may cause an interruption of traffic transmission, which cannot meet the real-time performance requirements of the IIoT traffic, so it is considered to enhance the resource pre-configuration of the target cell in the movement process.

Header compression of Ethernet: since a packet header of Ethernet is fixed and the air interface resources of the NR system are limited, it is a waste of the air interface resources that each packet header carries an Ethernet header. However, the NR system does not support the Ethernet header compression, so the enhancement is needed.

Instruction coordination of Ethernet terminals: since Ethernet requires multiple terminals to work in coordination with each other and it is impossible to guarantee that the clocks of Ethernet terminals are completely synchronized, it is difficult to coordinate the execution timing of different terminals when different terminals need to execute the same instruction at a certain moment. It is necessary to introduce the differential synchronization mechanism to guarantee the behavior coordination among user equipments (UEs).

SUMMARY

Embodiments of the present disclosure provide a resource periodicity configuration method and device, and a link processing and establishing method and device, to at least solve the problems in the related art that the periodicity interval corresponding to CG traffic or SPS traffic cannot well match the traffic mode of Ethernet and the real-time performance requirements of Internet of Things (IoT) traffic cannot be satisfied.

According to an embodiment, a resource periodicity configuration method is provided. The method includes steps described below, a network side receives a traffic mode and/or a clock accuracy capability reported by a UE; and the network side sends resource configuration information to the UE, where the resource configuration information carries at least one of: a periodicity factor of a configuration resource, a periodicity granularity of the configuration resource, or a periodicity length of the configuration resource; where the configuration information is used for configuring a resource related to SPS or CG of the UE.

Optionally, the periodicity factor of the configuration resource is used for indicating a unit of a resource periodicity of the configuration resource.

Optionally, in a case where the resource configuration information includes the periodicity factor, a periodicity of the CG is jointly determined by a configuration periodicity of the CG and the periodicity factor, or a periodicity of the SPS is jointly determined by a configuration periodicity of the SPS and the periodicity factor; or in a case where the resource configuration information includes the periodicity granularity and the periodicity length, a periodicity of the CG or a periodicity of the SPS is a time length of the periodicity length in a unit of the periodicity granularity.

According to an embodiment, a link path processing method is provided. The method includes steps described below, a source cell sends a resource configuration request for requesting resource configuration information to a target cell, and receives a resource configuration response fed back by the target cell; and the source cell sends a user equipment (UE) a target cell link addition request for establishing a link path between the UE and the target cell; where the target cell link addition request carries the resource configuration information, the resource configuration information carries at least one of: a periodicity factor of a configuration resource, a periodicity granularity of the configuration resource, or a periodicity length of the configuration resource, and the configuration information is used for configuring a resource related to SPS or CG of the UE.

Optionally, the target cell link addition request is further used for instructing the UE to monitor data processed by the source cell and data processed by the target cell, where the data processed by the source cell and the data processed by the target cell are sent on the resource related to the SPS or the CG.

Optionally, after the source cell sends the target cell link addition request to the UE, the method further includes steps described below, the source cell receives radio quality indication information sent by the UE, the radio quality indication information includes reference signal receiving power (RSRP) and/or reference signal receiving quality (RSRQ); and in a case of determining that the radio quality indication information indicates that quality of the source cell is poor, the source cell sends a mobility management entity (MME) a path handover indication for requesting handover to the target cell.

Optionally, the target cell link addition request is further used for instructing the UE to monitor data processed by the source cell or data processed by the target cell, where the data processed by the source cell or the data processed by the target cell is carried on the resource related to the SPS or the CG.

Optionally, the method further includes steps described below, the source cell receives radio quality indication information of the source cell or the target cell monitored by the UE, and the radio quality indication information includes RSRP and/or RSRQ; in a case of determining that the radio quality indication information indicates that quality of the source cell is poor, the source cell sends an MME a data forwarding timer and a path handover indication for requesting handover to the target cell; and in a case of determining that the radio quality indication information indicates that quality of the target cell is poor, the source cell sends the UE a target cell link deletion request for requesting deletion of the link path between the UE and the target cell. The data forwarding timer is used for instructing the MME to simultaneously send downlink data to the source cell and the target cell in case of no timeout.

Optionally, the method further includes a step described below, in a case of determining that the radio quality indication information indicates that quality of the source cell is poor, the source cell sends the UE a source cell link deletion request for deleting a link path between the UE and the source cell.

Optionally, the source cell link deletion request is further used for instructing the UE to monitor the data processed by the target cell, and the target cell link deletion request is further used for instructing the UE to monitor the data processed by the source cell.

According to an embodiment, a link path establishing method is provided. The method includes steps describe below, a UE receives a target cell link addition request sent by a source cell, and establishes a link path with a target cell; where the target cell link addition request carries resource configuration information, the resource configuration information is acquired by sending a resource configuration request to the target cell from the source cell, the resource configuration information carries at least one of: a periodicity factor of a configuration resource, a periodicity granularity of the configuration resource, or a periodicity length of the configuration resource, and the resource configuration information is used for configuring a resource related to SPS or CG of the UE.

Optionally, after the UE receives the target cell link addition request sent by the source cell and establishes the link path with the target cell, the method further includes a step described below, according to the target cell link addition request, the UE monitors data processed by the source cell and/or data processed by the target cell, where both the data processed by the source cell and the data processed by the target cell are sent or received on the resource related to the SPS or the CG.

Optionally, the method further includes a step described below, the UE sends radio quality indication information of the source cell to the source cell, where in a case of determining that the radio quality indication information is used for indicating that quality of the source cell is poor, the source cell sends an MME a path handover indication for requesting handover to the target cell.

Optionally, after the UE receives the target cell link addition request sent by the source cell and establishes the link path with the target cell, the method further includes a step described below, according to the target cell link addition request, the UE monitors data processed by the source cell, where the data processed by the source cell or data processed by the target cell is carried on the SPS or CG traffic resource.

Optionally, the method further includes a step described below, the UE sends the source cell radio quality indication information corresponding to one of the data processed by the source cell or the data processed by the target cell, where in a case where the radio quality indication information indicates that quality of the source cell is poor, the radio quality indication information is further used for instructing the source cell to send an MME a data forwarding timer and a path handover indication for requesting handover to the target cell; and in a case where the radio quality indication information indicates that quality of the target cell is poor, the UE receives the data forwarding timer and a target cell link deletion request sent by the source cell, and deletes the link path between the UE and the target cell after the forwarding timer times out. The data forwarding timer is used for instructing the MME to simultaneously send downlink data to the source cell and the target cell in case of no timeout.

Optionally, the method further includes a step described below, in a case where the radio quality indication information indicates that the quality of the source cell is poor, the UE receives a source cell link deletion request sent by the source cell, and deleting a link path between the UE and the source cell.

Optionally, after the link path between the UE and the source cell is deleted, the UE monitors the data processed by the target cell; and after the link path between the UE and the target cell is deleted, the UE monitors the data processed by the source cell.

According to an embodiment, a method for compressing a frame header of an Ethernet frame is provided. The method includes steps described below, a second communication node receives a first compressed data packet carrying a first Ethernet frame and sent by a first communication node, and receives correspondence information between header compression domain information and a frame header of the first Ethernet frame; and the second communication node receives a second compressed data packet carrying a second Ethernet frame and sent by the first communication node, and a frame header of the second Ethernet frame is recovered according to header compression domain information in the second Ethernet frame and the received correspondence information between the header compression domain information and the frame header of the first Ethernet frame. The first Ethernet frame is an Ethernet frame on which no header compression is performed, the second Ethernet frame is an Ethernet frame on which header compression is performed; and the header compression domain information includes a header compression domain profile and/or a header compression domain content index.

Optionally, the first communication node determines to send the second compressed data packet in the following manner: the first communication node judges whether an Ethernet frame header in a to-be-sent data packet is identical to an Ethernet frame header in a sent data packet; and in a case where a judgment result is yes, the second Ethernet frame after Ethernet frame header compression is carried in the to-be-sent data packet.

Optionally, in a case where the judgment result is no, or in a case where the first communication node determines that the sent data packet is transmitted incorrectly, a data packet carrying the first Ethernet frame is sent to the second communication node, or a data packet is stopped to be sent to the second communication node.

Optionally, the step in which the frame header of the second Ethernet frame is recovered according to the header compression domain information in the second Ethernet frame and a stored correspondence between the header compression domain information and the frame header in the first Ethernet frame includes steps described below, the second communication node matches stored header compression domain information with the header compression domain information in the second Ethernet frame; and in a case where the matching succeeds, a frame header of the matched second Ethernet frame is reported to a higher layer in a form of a data packet.

Optionally, in a case where the first communication node is a UE, the second communication node is a network side; in a case where the first communication node is a network side, the second communication node is a UE.

Optionally, in the case where the first communication node is the UE and the second communication node is the network side, the method further includes steps described below, the UE sends a support capability of Ethernet header compression to the network side, and receives a parameter of the Ethernet header compression fed back by the network side. The support capability of the Ethernet header compression includes at least one of: whether to support Ethernet header compression, or header compression domain information supporting Ethernet; and the parameter of the Ethernet header compression includes at least one of: an Ethernet domain indication for allowing compression, or header compression domain information for allowing compression.

Optionally, the header compression domain profile includes one of: not compressing the frame header of the Ethernet frame; compressing a destination address and a source address of Ethernet in the Ethernet frame; compressing a frame header of an Ethernet II frame; compressing a frame header of an institute of electrical and electronics engineers (IEEE) 802.3 frame carrying an 802.2 service access point (SAP) domain; compressing a frame header of an IEEE 802.3 frame containing a subnetwork access protocol (SNAP) domain; compressing a frame header of an Ethernet II frame containing an 802.1Q tag domain; compressing a frame header of an IEEE 802.3 frame containing an 802.2 SAP domain and an 802.1Q tag domain; compressing a frame header of an IEEE 802.3 frame containing an SNAP domain and an 802.1Q tag domain; compressing a frame header of an Ethernet II frame containing a first 802.1Q tag domain and a second 802.1Q tag domain; compressing a frame header of an IEEE 802.3 frame containing an 802.2 SAP domain, a first 802.1Q tag domain, and a second 802.1Q tag domain; compressing a frame header of an IEEE 802.3 frame containing an SNAP domain, a first 802.1Q tag domain, and a second 802.1Q tag domain; or compressing a frame header of a specific frame structure of industrial Ethernet. The header compression domain content index is used for identifying content of a compressed Ethernet frame header.

According to an embodiment, an Ethernet instruction coordination method is provided. The method includes steps described below, a fifth generation mobile communication technology system (5GS) acquires an arrival timestamp when a data packet arrives and a departure time when the data packet departures, respectively, and calculates a camped duration of the data packet; and the 5GS sends information carrying an instruction of a validation delay and the camped duration to a UE.

Optionally, the step in which the 5GS sends the information carrying the instruction of the validation delay and the camped duration to the UE includes that the 5GS calculates a difference between the validation delay and the camped duration and updates the instruction according to the difference.

Alternatively, the step in which the 5GS sends the information carrying the instruction of the validation delay and the camped duration to the UE includes that the 5GS adds the camped duration into the data packet and instructs the UE to update the validation delay according to the camped duration and the validation delay.

Alternatively, the step in which the 5GS sends the information carrying the instruction of the validation delay and the camped duration to the UE includes that the 5GS accumulates the camped duration to a camped duration in the data packet, and instructs the UE to update the validation delay according to the accumulated camped duration in the data packet and the validation delay.

According to an embodiment, a resource periodicity configuration device is provided. The device is located on a network side and includes a first receiving module and a configuration module, the first receiving module is configured to receive a traffic mode and/or a clock accuracy capability reported by a UE; and the configuration module is configured to send resource configuration information to the UE. The resource configuration information carries at least one of: a periodicity factor of a configuration resource, a periodicity granularity of the configuration resource, or a periodicity length of the configuration resource; and the configuration information is used for configuring a resource related to SPS or CG of the UE.

According to an embodiment, a link path processing device is provided. The device is located in a source cell and includes a second receiving module and a sending module, the second receiving module is configured to: send a resource configuration request for requesting resource configuration information to a target cell, and receive a resource configuration response fed back by the target cell; and the sending module is configured to send a target cell link addition request for establishing a link path between the UE and the target cell to a UE. The target cell link addition request carries the resource configuration information, the resource configuration information carries at least one of: a periodicity factor of a configuration resource, a periodicity granularity of the configuration resource, or a periodicity length of the configuration resource, and the configuration information is used for configuring a resource related to SPS or CG of the UE.

According to an embodiment, a link path establishing device is provided. The device is located in a UE and includes an establishment module, which is configured to: receive a target cell link addition request sent by a source cell, and establish a link path with a target cell; where the target cell link addition request carries resource configuration information, the resource configuration information is acquired by sending a resource configuration request by the source cell to the target cell, the resource configuration information carries at least one of: a periodicity factor of a configuration resource, a periodicity granularity of the configuration resource, or a periodicity length of the configuration resource, and the resource configuration information is used for configuring a resource related to SPS or CG of the UE.

According to an embodiment, a device for compressing a frame header of an Ethernet frame is provided. The device is located in a second communication node and includes a storage module and a recovery module, the storage module is configured to receive by the second communication node a first compressed data packet carrying a first Ethernet frame and sent by a first communication node, and receive correspondence information between header compression domain information and a frame header of the first Ethernet frame; and the recovery module is configured to: receive a second compressed data packet carrying a second Ethernet frame and sent by the first communication node, and recover a frame header of the second Ethernet frame according to header compression domain information in the second Ethernet frame and the received correspondence information between the header compression domain information and the frame header of the first Ethernet frame. The first Ethernet frame is an Ethernet frame on which no header compression is performed, the second Ethernet frame is an Ethernet frame on which header compression is performed; and the header compression domain information includes a header compression domain profile and/or a header compression domain content index.

According to an embodiment, an Ethernet instruction coordination device is provided. The device is located in a 5GS system and includes a calculation module and an indication module, the calculation module is configured to acquire an arrival timestamp when a data packet arrives and a departure time when the data packet departures, respectively, and calculate a camped duration of the data packet; and the indication module is configured to send information carrying an instruction of a validation delay and the camped duration to a UE.

According to another embodiment, a storage medium is further provided. The storage medium is configured to store a computer program, where the computer program is configured to, when executed, perform steps of any one of the method embodiments described above.

According to another embodiment, an electronic device is further provided. The electronic device includes a memory and a processor. The memory is configured to store a computer program, and the processor is configured to execute the computer program to perform steps of any one of the method embodiments described above.

Through the present disclosure, the problems in the related art that the periodicity interval corresponding to the CG traffic or SPS traffic cannot well match the traffic mode of Ethernet and the real-time performance requirements of the IoT traffic cannot be satisfied can be solved, thereby achieving the effects of the optimization of the traffic periodicity and satisfying the real-time performance requirements of the IIoT traffic.

DETAILED DESCRIPTION

The present disclosure will be hereinafter described in detail with reference to drawings in conjunction with embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

Embodiment One

Figure 1:
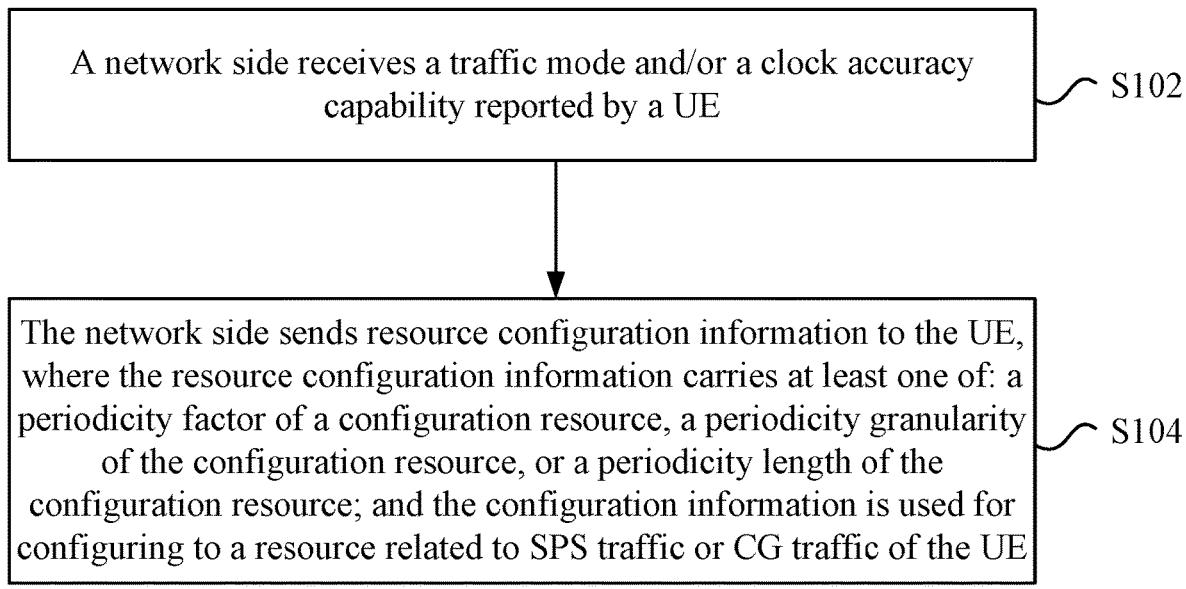
FIG. 1 is a flowchart of a resource periodicity configuration method according to an embodiment of the present disclosure.

This embodiment provides a resource periodicity configuration method. FIG. 1 is a flowchart of a resource periodicity configuration method according to an embodiment of the present disclosure. As shown in FIG. 1, the method includes the steps described below.

In step S102, a network side receives a traffic mode and/or a clock accuracy capability reported by a UE.

In step S104, the network side sends resource configuration information to the UE, where the resource configuration information carries at least one of: a periodicity factor of a configuration resource, a periodicity granularity of the configuration resource, or a periodicity length of the configuration resource; and the configuration information is used for configuring a resource related to SPS or CG of the UE.

According to an embodiment, the resource periodicity configuration method is provided. The method includes: sending, by the network side to the UE, the resource configuration information carrying at least one of: the periodicity factor of the configuration resource, the periodicity granularity of the configuration resource, or the periodicity length of the configuration resource. The configuration information is used for indicating CG traffic or SPS traffic of the UE.

Optionally, the periodicity factor of the configuration resource is used for indicating the unit of a resource periodicity of the configuration resource.

Optionally, in a case where the resource configuration information includes the periodicity factor, a periodicity of the CG is jointly determined by a configuration periodicity of the CG and the periodicity factor, or a periodicity of the SPS is jointly determined by a configuration periodicity of the SPS and the periodicity factor; alternatively, in a case where the resource configuration information includes the periodicity granularity and the periodicity length, a periodicity of the CG or a periodicity of the SPS is a time length of the periodicity length in the unit of the periodicity granularity.

Figure 2:
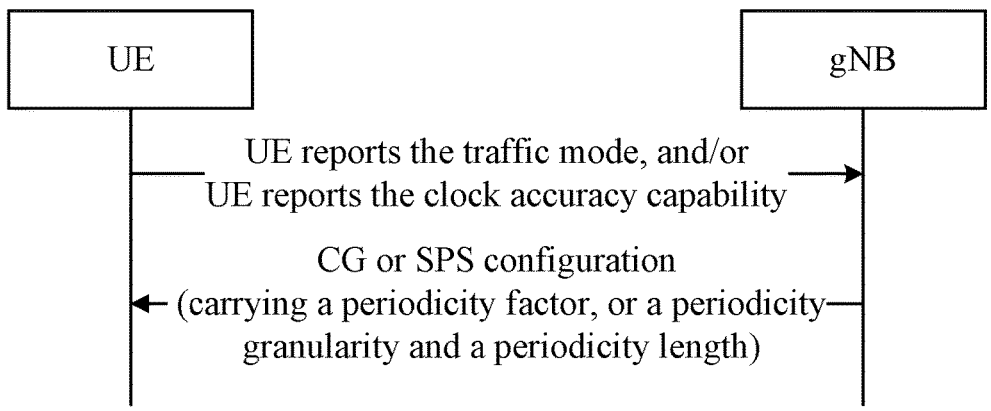
FIG. 2 is a schematic diagram of traffic periodicity optimization of CG traffic or SPS traffic according to an embodiment of the present disclosure.

FIG. 2 is a schematic diagram of traffic periodicity optimization of CG traffic or SPS traffic according to an embodiment of the present disclosure. As shown in FIG. 2, the UE reports a traffic mode and/or a UE clock accuracy capability information to the network side.

The traffic mode includes at least one of: the size of a data packet, or information related to a transmission time interval of the data packet. The reporting of the traffic mode may be carried through a radio resource control (RRC) message and/or an uplink media access control (MAC) control element (CE).

The RRC message includes at least one of the followings: an RRC message 3 (RRC Msg3) (an RRC connection request (RRCConnectionRequest), an RRC early data request message (RRCArlyDataRequest), an RRC connection resume request (RRCConnectionResumeRequest), or an RRC connection resume re-establishment request (RRCConnectionReestablishment Request), an RRC message 5 (RRC Msg5) (an RRC connection setup complete message (RRCConnectionSetupComplete), an RRC connection resume complete message (RRCConnectionResumeComplete), or an RRC connection re-establishment complete message (RRCConnectionReestablishmentComplete), or other newly-introduced uplink RRC messages.

The UE clock accuracy capability information includes at least a UE clock accuracy level (for example, stratum-1, . . . or stratum-4) or the maximum error of a UE clock per unit time (for example, in units of ppm, or in units of the maximum error of x microseconds per second). The UE clock accuracy capability information is reported in any one of the following manners: reported together with UE traffic mode information; independently reported through the RRC Msg5 (RRCConnectionSetupComplete, RRCConnectionResumeComplete, or RRCConnectionReestablishment-Complete), or independently reported through UE capability information (UECapabilityInformation).

The network side sends a resource configuration of the CG or SPS to the UE, the resource configuration of the CG or SPS carries at least one piece of the following information: the periodicity factor, a traffic opportunity within a periodicity represented in a manner of a bitmap, multiple sets of CG or SPS resources carrying resource configuration indexes, or the periodicity granularity and the periodicity length. The resource configuration is performed in a downlink RRC message.

Specifically, the value range of a traffic periodicity of the CG or the SPS includes as follows (in units of symbols):

in a case where a subcarrier spacing (SCS) is equal to 15 kHz: 2, 7, and n*14, where n={1, 2, 4, 5, 8, 10, 16, 20, 32, 40, 64, 80, 128, 160, 320, 640};

in a case where the SCS is equal to 30 kHz: 2, 7, and n*14, where n={1, 2, 4, 5, 8, 10, 16, 20, 32, 40, 64, 80, 128, 160, 256, 320, 640, 1280};

in a case where the SCS is equal to 60 kHz with a normal cyclic prefix (CP): 2, 7, and n*14, where n={1, 2, 4, 5, 8, 10, 16, 20, 32, 40, 64, 80, 128, 160, 256, 320, 512, 640, 1280, 2560};

in a case where the SCS is equal to 60 kHz with an extended cyclic prefix (ECP): 2, 6, and n*12, where n={1, 2, 4, 5, 8, 10, 16, 20, 32, 40, 64, 80, 128, 160, 256, 320, 512, 640, 1280, 2560}; and in a case where the SCS is equal to 120 kHz: 2, 7, and n*14, where n={1, 2, 4, 5, 8, 10, 16, 20, 32, 40, 64, 80, 128, 160, 256, 320, 512, 640, 1024, 1280, 2560, 5120}.

One subframe is the duration of 1 ms, one subframe corresponds to 1 to 16 slots, and one slot corresponds to 12 or 14 symbols, specifically as shown in Table 1.

TABLE 1

| SCS | $N_{symb}^{slot}$ | $N_{slot}^{subframe,\mu}$ |
|---|---|---|
| 15 kHz | 14 | 1 |
| 30 kHz | 14 | 2 |
| 60 kHz with normal CP | 14 | 4 |
| 60 kHz with extended CP | 12 | 4 |
| 120 kHz | 12 | 8 |
| 240 kHz | 14 | 16 |

That is to say, in the NR standards of the related art, the maximum traffic periodicity of the CG or the SPS is 640 ms, the value range has a relatively large interval, and periodicities outside the value range (such as n=480) cannot be configured. Therefore, when the network side configures the CG or SPS for the UE, besides the resource periodicity, the network side also configures the periodicity factor, the traffic opportunity within a periodicity represented in the manner of a bitmap, multiple sets of CG or SPS resources carrying resource configuration indexes, or the periodicity granularity and the periodicity length. The resource configuration index is used by the network side to simultaneously activate or deactivate one or more CGs or SPSs in the manner of the bitmap.

The periodicity factor may be a positive integer, for example, an enumerated value from 1/n to m, where n and m are positive integers.

The periodicity granularity is used for representing the unit of a new periodicity, and the value range includes at least symbols, slots, subframes, radio frames, and times per second (Hz).

The new periodicity represents a periodicity length in the unit of the periodicity granularity, and the value range may be a positive integer, for example, a value from 1 to m, where m is a positive integer.

If the periodicity factor is configured, the resource interval or periodicity of the CG or the SPS is: resource periodicity*periodicity factor.

If the periodicity granularity and the new periodicity are configured, the resource interval or periodicity of the CG or the SPS is a time interval with the periodicity granularity as the unit and the new periodicity as the length.

If the configured periodicity granularity is Hz, the resource interval or periodicity of the CG or the SPS is calculated in the following manner: dividing (1/new periodicity as the length)s by (the number of symbols per second), then performing the round-up, and taking the calculated number of symbols as the resource interval or periodicity, that is, the calculation method of the resource interval or periodicity is:

$$\left\lceil \frac{1/\text{configured periodicity length}}{\text{the number of symbols per second}} \right\rceil \text{symbols.}$$

Alternatively, the configured periodicity granularity is Hz, the method of determining the resource location of the CG or the SPS is that: a time length from a start location of an $n^{th}$ resource to a start location of a first resource is:

$$\left\lceil n * \frac{1/\text{configured periodicity length}}{\text{the number of symbols per second}} \right\rceil \text{symbols,}$$

where n is a positive integer.

If the traffic opportunity within the periodicity represented in the manner of the bitmap is configured, the traffic opportunity appears in the periodicity range according to the mode indicated by the bitmap. For example, if the traffic periodicity is one radio frame, and Bitstring=1010000000, the traffic opportunity appears once in the $0^{th}$ slot and the $2^{nd}$ slot within one radio frame and no longer appears in the rest slots.

If multiple sets of CG or SPS resources are configured, each set of resources corresponds to one resource index, and one bitmap is used to correspond to the resource indexes. For example, an eight-set resource configuration corresponds to an 8-bit bitmap. $1^{st}$ bit represents the first set of resources, $2^{nd}$ bit represents the second set of resources, . . . , and $8^{th}$ bit represents the eighth set of resources. A bit value of 0 represents that the related operation is not related to the corresponding resource, and a bit value of 1 represents that the related operation is related to the corresponding resource. For example, activating resources of resource indexes having the bitmap value of 10100000 represents that the first and third sets of CG/SPS resources are activated.

From the description of the embodiments described above, it will be apparent to those skilled in the art that the methods in the embodiments described above may be implemented by means of software plus a necessary general-purpose hardware platform, or may of course be implemented by hardware. The solution of the present disclosure may be substantially embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method in each of the embodiments described above.

Embodiment Two

Figure 3:
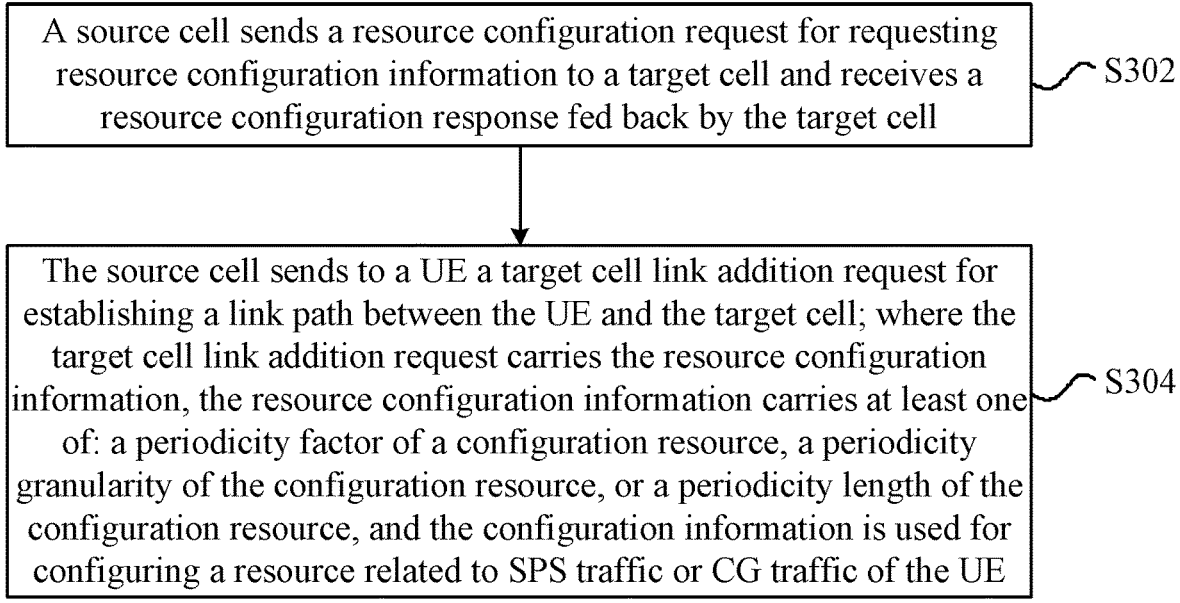
FIG. 3 is a flowchart of a link path processing method according to an embodiment of the present disclosure.

This embodiment provides a link path processing method. FIG. 3 is a flowchart of a link path processing method according to an embodiment of the present disclosure. As shown in FIG. 3, the method includes the steps described below.

In step S302, a source cell sends a resource configuration request for requesting resource configuration information to a target cell and receives a resource configuration response fed back by the target cell.

In step S304, the source cell sends a target cell link addition request for establishing a link path between the UE and the target cell to a UE; where the target cell link addition request carries the resource configuration information, the resource configuration information carries at least one of: a periodicity factor of a configuration resource, a periodicity granularity of the configuration resource, or a periodicity length of the configuration resource, and the configuration information is used for configuring a resource related to SPS or CG of the UE.

Optionally, the target cell link addition request is further used for instructing the UE to monitor data processed by the source cell and data processed by the target cell, where the data processed by the source cell and the data processed by the target cell are sent on the resource related to the SPS or the CG.

Optionally, the method further includes the steps described below, after the source cell sends the target cell link addition request to the UE, the source cell receives at least one piece of the following radio quality indication information sent by the UE: RSRP or RSRQ; and in a case of determining that the radio quality indication information indicates that quality of the source cell is poor, the source cell sends a path handover indication for requesting handover to the target cell to an MME.

Optionally, the target cell link addition request is further used for instructing the UE to monitor data processed by the source cell or data processed by the target cell, and the data processed by the source cell or the data processed by the target cell is carried on the resource related to the SPS or the CG.

Optionally, the method further includes the steps described below, the source cell receives radio quality indication information of RSRP and/or RSRQ of the source cell or the target cell monitored by the UE; in a case of determining that the radio quality indication information indicates that quality of the source cell is poor, the source cell sends an MME a data forwarding timer and a path handover indication for requesting handover to the target cell; and in a case of determining that the radio quality indication information indicates that quality of the target cell is poor, the source cell sends a target cell link deletion request for requesting deletion of the link path between the UE and the target cell to the UE. The data forwarding timer is used for instructing the MME to simultaneously send downlink data to the source cell and the target cell in case of no timeout.

Optionally, the method further includes the step described below, in a case of determining that the radio quality indication information indicates that the quality of the source cell is poor, the source cell sends a source cell link deletion request for deleting a link path between the UE and the source cell to the UE.

Optionally, the source cell link deletion request is further used for instructing the UE to monitor the data processed by the target cell, and the target cell link deletion request is further used for instructing the UE to monitor the data processed by the source cell.

From the description of the embodiments described above, it will be apparent to those skilled in the art that the method in the embodiments described above may be implemented by means of software plus a necessary general-purpose hardware platform, or may of course be implemented by hardware. The solution of the present disclosure may be embodied in the form of a software product. The computer software product is stored in a storage medium (such as a ROM/RAM, a magnetic disk or an optical disk) and includes several instructions for enabling a terminal device (which may be a mobile phone, a computer, a server, a network device or the like) to execute the method in each of the embodiments described above.

Embodiment Three

Figure 4:
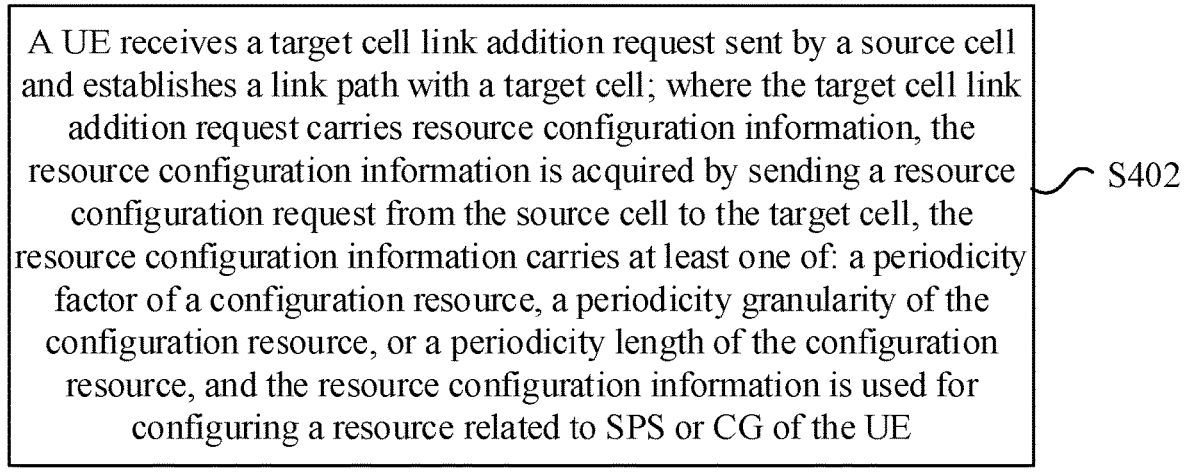
FIG. 4 is a flowchart for establishing a link path according to an embodiment of the present disclosure.

This embodiment provides a link path establishing method. FIG. 4 is a flowchart of a link path establishing method according to an embodiment of the present disclosure. As shown in FIG. 4, the method includes the step described below.

In step S402, a UE receives a target cell link addition request sent by a source cell and establishes a link path with a target cell. The target cell link addition request carries resource configuration information, the resource configuration information is acquired by sending a resource configuration request from the source cell to the target cell, the resource configuration information carries at least one of: a periodicity factor of a configuration resource, a periodicity granularity of the configuration resource, or a periodicity length of the configuration resource, and the resource configuration information is used for configuring a resource related to SPS or CG of the UE.

Optionally, after the UE receives the target cell link addition request sent by the source cell and establishes the link path with the target cell, the method further includes the step described below, the UE monitors data processed by the source cell and/or data processed by the target cell according to the target cell link addition request, where both the data processed by the source cell and the data processed by the target cell are sent or received on the resource related to the SPS or the CG.

Optionally, the method further includes the step described below, the UE sends radio quality indication information of the source cell to the source cell, and in a case of determining that the radio quality indication information is used for indicating that quality of the source cell is poor, the source cell sends an MME a path handover indication for requesting handover to the target cell.

Optionally, after the UE receives the target cell link addition request sent by the source cell and establishes the link path with the target cell, the method further includes the step described below, the UE monitors data processed by the source cell according to the target cell link addition request, where the data processed by the source cell or data processed by the target cell is carried on a CG or SPS traffic resource.

Optionally, the method further includes the steps described below, the UE sends radio quality indication information corresponding to one of the data processed by the source cell or the data processed by the target cell to the source cell, in a case where the radio quality indication information indicates that quality of the source cell is poor, the quality indication information is further used for instructing the source cell to send an MME a data forwarding timer and a path handover indication for requesting handover to the target cell; and in a case where the quality indication information indicates that quality of the target cell is poor, the UE receives the data forwarding timer and a target cell link deletion request sent by the source cell and deletes the link path between the UE and the target cell after the forwarding timer times out. The data forwarding timer is used for instructing the MME to simultaneously send downlink data to the source cell and the target cell in case of no timeout.

Optionally, the method further includes the step described below, in a case where the quality indication information indicates that the quality of the source cell is poor, the UE receives a source cell link deletion request sent by the source cell and deletes a link path between the UE and the source cell.

Optionally, after the link path between the UE and the source cell is deleted, the UE monitors the data processed by the target cell; and after the link path between the UE and the target cell is deleted, the UE monitors the data processed by the source cell.

From the description of the embodiments described above, it will be apparent to those skilled in the art that the method in the embodiments described above may be implemented by means of software plus a necessary general-purpose hardware platform, or may of course be implemented by hardware. The solution of the present disclosure may be embodied in the form of a software product. The computer software product is stored in a storage medium (such as a ROM/RAM, a magnetic disk or an optical disk) and includes several instructions for enabling a terminal device (which may be a mobile phone, a computer, a server, a network device or the like) to execute the method in each of the embodiments described above.

In order to better understand the solutions described above, this embodiment further provides two scenarios.

Scenario One

Figure 5:
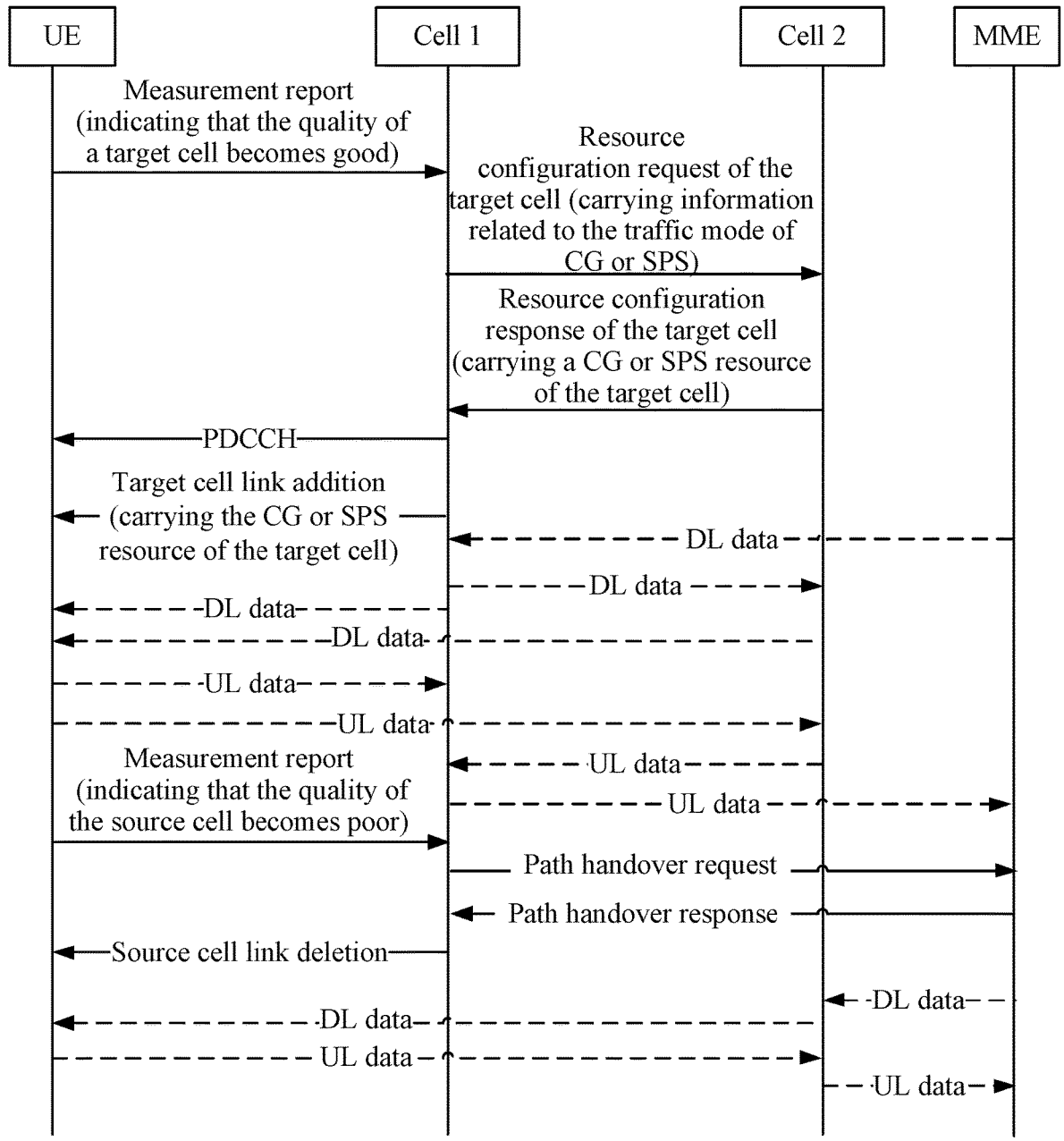
FIG. 5 is a flowchart of soft handover in a resource pre-configuration scenario according to an embodiment of the present disclosure.

FIG. 5 is a flowchart of a resource pre-configuration scenario of soft handover according to an embodiment of the present disclosure. As shown in FIG. 5, the soft handover includes the followings:

a UE camping in a source cell (Cell 1) reports a measurement report that the quality of a target cell (Cell 2) becomes good.

The source cell (Cell 1) sends a resource configuration request to the target cell (Cell 2), where the resource configuration request carries a traffic mode of CG or SPS (such as a traffic start time, a size and a periodicity of a data packet, or CG or SPS configuration information of the source cell such as grant information, a periodicity, and an activation opportunity).

The target cell (Cell 2) sends a resource configuration response to the source cell (Cell 1), where the resource configuration response carries CG or SPS configuration information (information such as grant information, a periodicity, and an activation opportunity).

The source cell (Cell 1) sends a target cell link addition request to the UE, where the target cell link addition request carries CG or SPS configuration information (information such as grant information, a periodicity, and an activation opportunity). The target cell link addition request may be carried through handover-related downlink RRC signaling such as RRCConnectionReconfiguration.

The UE simultaneously monitors scheduling/downlink data of the source cell (Cell 1) and the target cell (data sent by the MME to Cell 1 may be forwarded to Cell 2 and then sent to the UE at the same time), and/or simultaneously transmits data in the source cell (Cell 1) and the target cell (Cell 2 receives the data and forwards the data to Cell 1, and Cell 1 combines the data and sends the combined data to the MME).

The UE reports an indication of the poor quality of the source cell sent by the source cell (Cell 1), and the indication may be sent through a measurement report/radio link failure (RLF), or the source cell obtains the indication through the uplink RLF detection.

The source cell (Cell 1) sends a path handover indication to the MME, and the MME switches an Ng interface connection to the target cell (Cell 2).

The source cell (Cell 1) sends a source cell link deletion request to the UE. The source cell link deletion request may be carried through handover-related downlink RRC signaling such as RRCConnectionReconfiguration.

The UE only monitors the scheduling/downlink data of the target cell (the MME sends data to Cell 2, and Cell 2 sends the data to the UE), and/or, the target cell performs the data transmission (Cell 2 receives the data and then sends the data to the MME).

It is to be noted that the differences between this scenario and the soft handover process in the 3G system are as follows: in the 3G system, the control node is a radio network controller (RNC); while there is no RNC in this scenario, and the control node is a primary cell (PCell). In the 3G system, there is no pre-configured resource; while in this scenario, the resource request sent to the target cell carries the traffic mode, and the response of the target cell carries resource grant information; and in the 3G system, a radio link (RL) addition request exists between cells, and the UU interface sends Active Set Update; while in this scenario, an RL addition request exists between cells, and the UU interface sends RRC Connection Reconfiguration.

Scenario Two

Figure 6:
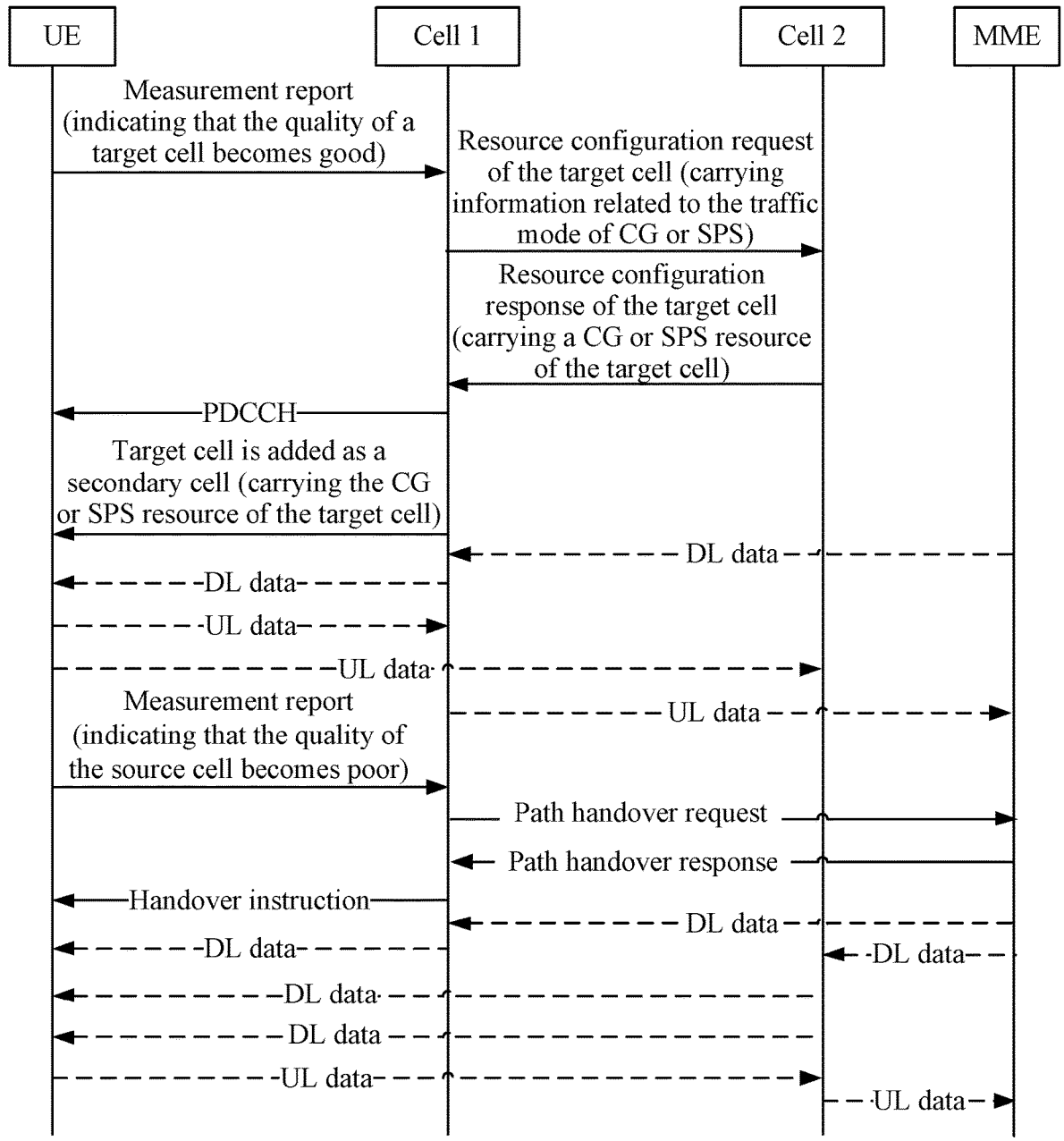
FIG. 6 is a flowchart of another soft handover in a resource pre-configuration scenario according to an embodiment of the present disclosure.

FIG. 6 is a flowchart of a resource pre-configuration scenario according to an embodiment of the present disclosure. As shown in FIG. 6, the dual connection includes the followings.

A UE camping in a source cell (Cell 1) reports a measurement report that quality of a target cell (Cell 2) becomes good.

The source cell (Cell 1) sends a resource configuration request to the target cell (Cell 2), where the resource configuration request carries a traffic mode of CG or SPS (such as a traffic start time, a size and a periodicity of a data packet, or CG or SPS configuration information of the source cell such as grant information, a periodicity, and an activation opportunity).

The target cell (Cell 2) sends a resource configuration response to the source cell (Cell 1), where the resource configuration response carries CG or SPS configuration information (information such as grant information, a periodicity, and an activation opportunity).

The source cell (Cell 1) sends a dual-connection establishment request to the UE, where the dual-connection establishment request carries CG or SPS configuration information of a secondary cell (SCell) (such as grant information, a periodicity, and an activation opportunity). The target cell link addition request may be carried through handover-related downlink RRC signaling such as RRCConnectionReconfiguration.

The UE monitors the scheduling/downlink data of the source cell (Cell 1) (Cell 1 sends the UE the data sent from the MME to Cell 1), and/or, the source cell (Cell 1) performs the data transmission (Cell 1 sends the data to the MME after receiving the data).

The UE reports an indication of the poor quality of the source cell sent by the source cell (Cell 1), and the indication may be sent through a measurement report/RLF, or the source cell obtains the indication through the uplink RLF detection.

The source cell (Cell 1) sends a path handover indication to the MME, and a data forward timer is carried at the same time. The MME switches an Ng interface connection to the target cell (Cell 2), the Ng link between the source cell and the target cell is maintained within the timer, and the MME simultaneously sends downlink data to the source cell and the target cell.

The source cell (Cell 1) sends a handover instruction to the UE. The handover instruction may be carried through handover-related downlink RRC signaling such as RRCConnectionReconfiguration.

After receiving the handover instruction, the UE starts to monitor the scheduling/downlink data of the target cell (Cell 2) (Cell 1 and Cell 2 simultaneously send the UE the data sent from the MME to Cell 1 and Cell 2), and/or the data transmission is performed in the target cell (Cell 2) (Cell 2 sends the data to the MME after receiving the data).

The UE only monitors the scheduling/downlink data of the target cell (the MME sends data to Cell 2, and Cell 2 sends the data to the UE), and/or, the target cell performs the data transmission (Cell 2 receives data and sends the data to the MME).

It is to be noted that the scheme in which only the data processed by the target cell is monitored is similar to the scheme in which only the data processed by the source cell is monitored. The difference is that the object to which the UE reports the monitored data is still the source cell instead of directly reporting to the target cell. The instruction related to deleting the link is also made by the source cell. In addition, since no handover process is involved, in this manner, the source cell does not send any handover instruction to the UE.

It is to be noted that the differences between Scenario two and Scenario one are as follows: in the scenario of dual connection, the UE monitors CG/SPS information of only one cell; and in the process of sending the handover instruction, the source cell and the target cell may simultaneously send the downlink data to the UE, but the UE only monitors one of the two cells.

Even if the UE receives the configuration information of the target cell serving as the SCell, the UE still only monitors the CG/SPS channel of the source cell until the UE receives the handover instruction, and then the UE starts to only monitor the CG/SPS information of the target cell.

The above-mentioned two scenarios differ from the dual connection in the related art in that in the dual connection in the related art, after the UE receives the handover instruction, the primary cell and the secondary cell are simultaneously released, and the UE re-synchronizes in the target cell; while in the above-mentioned scenarios, after the UE receives the handover instruction, the synchronization of the secondary cell, resource configurations such as the CG/SPS and the like are still maintained, and the UE does not need to re-synchronizes in the target cell.

Embodiment Four

Figure 7:
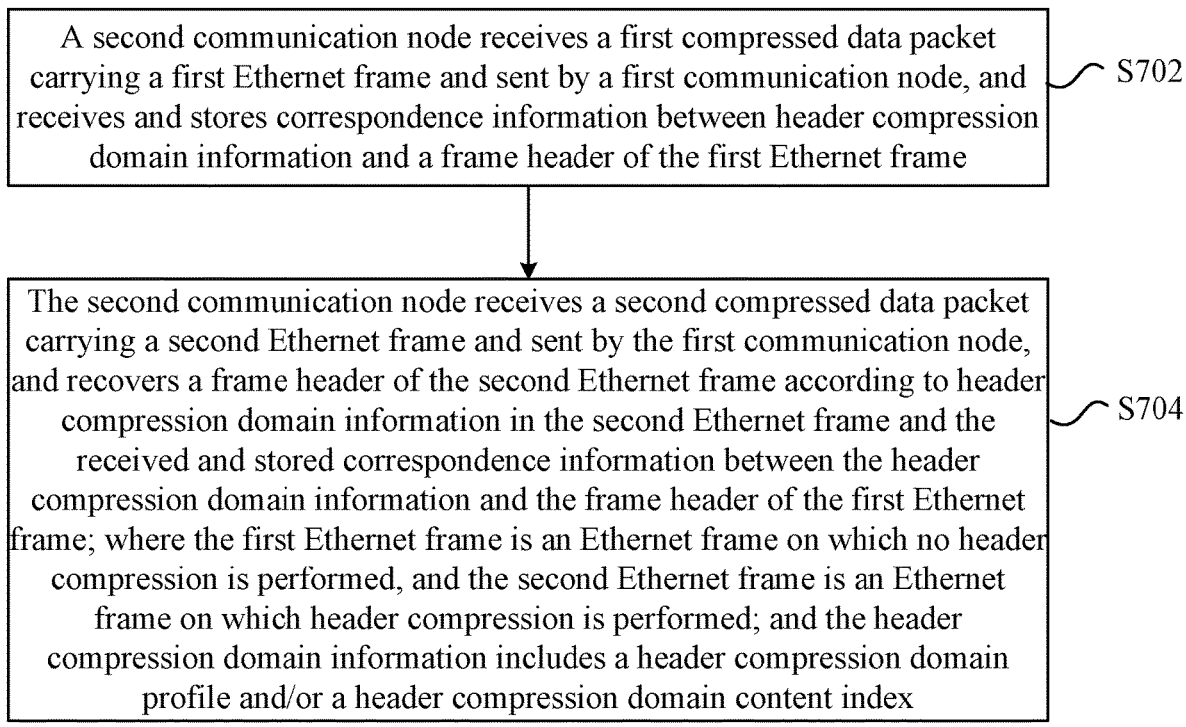
FIG. 7 is a flowchart of a method for compressing a frame header of an Ethernet frame according to an embodiment of the present disclosure.

This embodiment provides a method for compressing a frame header of an Ethernet frame. FIG. 7 is a flowchart of a method for compressing a frame header of an Ethernet frame according to an embodiment of the present disclosure. As shown in FIG. 7, the method includes the steps described below.

In step S702, a second communication node receives a first compressed data packet carrying a first Ethernet frame and sent by a first communication node, and receives correspondence information between header compression domain information and a frame header of the first Ethernet frame.

In step S704, the second communication node receives a second compressed data packet carrying a second Ethernet frame and sent by the first communication node, and recovers a frame header of the second Ethernet frame according to header compression domain information in the second Ethernet frame and the received correspondence information between the header compression domain information and the frame header of the first Ethernet frame. The first Ethernet frame is an Ethernet frame on which no header compression is performed, the second Ethernet frame is an Ethernet frame on which header compression is performed; and the header compression domain information includes a header compression domain profile and/or a header compression domain content index.

Optionally, the first communication node determines to send the second compressed data packet in the following manner: the first communication node judges whether an Ethernet frame header in a to-be-sent data packet is identical to an Ethernet frame header in a sent data packet; and in a case where a judgment result is yes, the second Ethernet frame after Ethernet frame header compression is carried in the to-be-sent data packet.

Optionally, in a case where the judgment result is no, or in a case where the first communication node determines that the sent data packet is transmitted incorrectly, a data packet carrying the first Ethernet frame is sent to the second communication node, or a data packet is stopped to be sent to the second communication node.

Optionally, the step in which the frame header of the second Ethernet frame is recovered according to the header compression domain information in the second Ethernet frame and a stored correspondence between the header compression domain information and the frame header in the first Ethernet frame includes the following step: the second communication node matches the stored header compression domain information with the header compression domain information in the second Ethernet frame, and in a case where the matching succeeds, a frame header of the matched second Ethernet frame is reported to a higher layer in a form of a data packet.

Optionally, when the first communication node is a UE, the second communication node is a network side; and when the first communication node is a network side, the second communication node is a UE.

Optionally, in the case where the first communication node is the UE and the second communication node is the network side, the method further includes steps described below, the UE sends a support capability of Ethernet header compression to the network side, and receives a parameter of the Ethernet header compression fed back by the network side. The support capability of the Ethernet header compression includes at least one of: whether to support Ethernet header compression, or header compression domain information supporting Ethernet; and the parameter of the Ethernet header compression includes at least one of: an Ethernet domain indication for allowing compression, or header compression domain information for allowing compression.

Optionally, the header compression domain profile includes one of: not compressing the frame header of the Ethernet frame; compressing a destination address and a source address of Ethernet in the Ethernet frame; compressing a frame header of an Ethernet II frame; compressing a frame header of an IEEE 802.3 frame carrying an 802.2 SAP domain; compressing a frame header of an IEEE 802.3 frame containing an SNAP domain; compressing a frame header of an Ethernet II frame containing an 802.1Q tag domain; compressing a frame header of an IEEE 802.3 frame containing an 802.2 SAP domain and an 802.1Q tag domain; compressing a frame header of an IEEE 802.3 frame containing an SNAP domain and an 802.1Q tag domain; compressing a frame header of an Ethernet II frame containing a first 802.1Q tag domain and a second 802.1Q tag domain; compressing a frame header of an IEEE 802.3 frame containing an 802.2 SAP domain, a first 802.1Q tag domain, and a second 802.1Q tag domain; compressing a frame header of an IEEE 802.3 frame containing an SNAP domain, a first 802.1Q tag domain, and a second 802.1Q tag domain; or compressing a frame header of a specific frame structure of industrial Ethernet. The header compression domain content index is used for identifying content of a compressed Ethernet frame header.

Specifically, the header compression domain information includes at least one of: a header compression domain profile, or a header compression domain content index.

Figure 8:
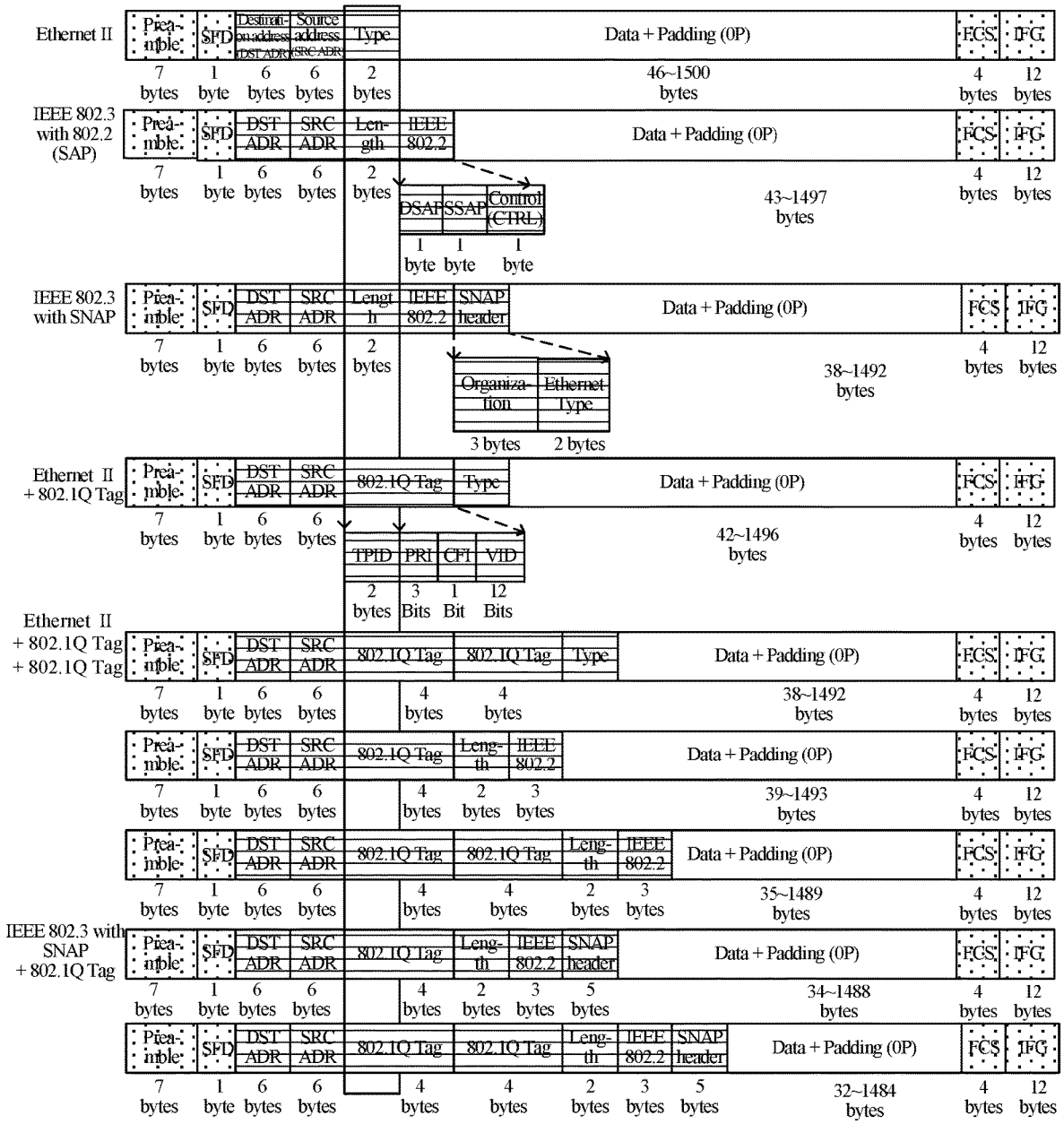
FIG. 8 is a structural diagram of an Ethernet frame according to an embodiment of the present disclosure.

FIG. 8 is a structural diagram of an Ethernet frame according to an embodiment of the present disclosure. As shown in FIG. 8, a preamble, a start frame delimiter (SFD), a frame check sequence (FCS), and an inter frame gap (IFG) are not transmitted in the 5G system and need not be considered.

The destination address (DST ADR) and the source address (SRC ADR) have the same locations in different frame structures, and the locations of the rest headers vary with the frame structures.

Therefore, the Ethernet header compression domain profiles or index include at least the followings:
  not compressing an Ethernet header;
  only compressing a destination address and a source address of Ethernet;
  compressing a frame header of an Ethernet II frame (including DST ADR, SRC ADR, and Type);
  compressing a frame header of an IEEE 802.3 frame carrying an 802.2 SAP domain (including DST ADR, SRC ADR, Length, and IEEE 802.2);
  compressing a frame header of an IEEE 802.3 frame containing an SNAP domain (including DST ADR, SRC ADR, Length, IEEE 802.2, and SNAP Header);
  compressing a frame header of an Ethernet II frame containing an 802.1Q tag domain (including DST ADR, SRC ADR, 802.1Q Tag, and Type);
  compressing a frame header of an IEEE 802.3 frame containing an 802.2 SAP domain and an 802.1Q tag domain (including DST ADR, SRC ADR, 802.1Q Tag, Length, and IEEE 802.2);
  compressing a frame header of an IEEE 802.3 frame containing an SNAP domain and an 802.1Q tag domain (including DST ADR, SRC ADR, 802.1Q Tag, Length, IEEE 802.2, and SNAP Header);
  compressing a frame header of an Ethernet II frame containing a first 802.1Q tag domain and a second 802.1Q tag domain (including DST ADR, SRC ADR, 802.1Q Tag, 802.1Q Tag, and Type);

compressing a frame header of an Ethernet 802.3 frame containing an 802.2 SAP domain, a first 802.1Q tag domain, and a second 802.1Q tag domain (including DST ADR, SRC ADR, 802.1Q tag, 802.1Q Tag, Length, and IEEE 802.2);

compressing a frame header of an IEEE 802.3 frame containing an SNAP domain, a first 802.1Q tag domain, and a second 802.1Q tag domain (including DST ADR, SRC ADR, 802.1Q Tag, an 802.1Q Tag, Length, IEEE 802.2, and SNAP Header); or compressing a frame header of a specific frame structure of industrial Ethernet (including a frame header of an EtherCAT frame, a frame header of a Profinet frame, and a frame header of a PROFIsafe frame).

IEEE 802.2 includes three sub-headers: a destination service access point (DSAP), a source SAP (SSAP), a control domain (CTRL) (which are compressed or not compressed simultaneously with IEEE 802.2).

SNAP Header includes two sub-headers: Organization and Ether Type (which are compressed or not compressed simultaneously with SNAP Header).

802.1Q Tag includes four sub-headers: a tag protocol identifier (TPID), a user priority (user_priority: PRI), a canonical format indicator (CFI), and a virtual local area network indicator (VLANID, VID) (which are compressed or not compressed simultaneously with 802.1Q Tag).

That is, at least the above-mentioned 12 Ethernet header compression domain profiles or indexes are defined.

Figure 9:
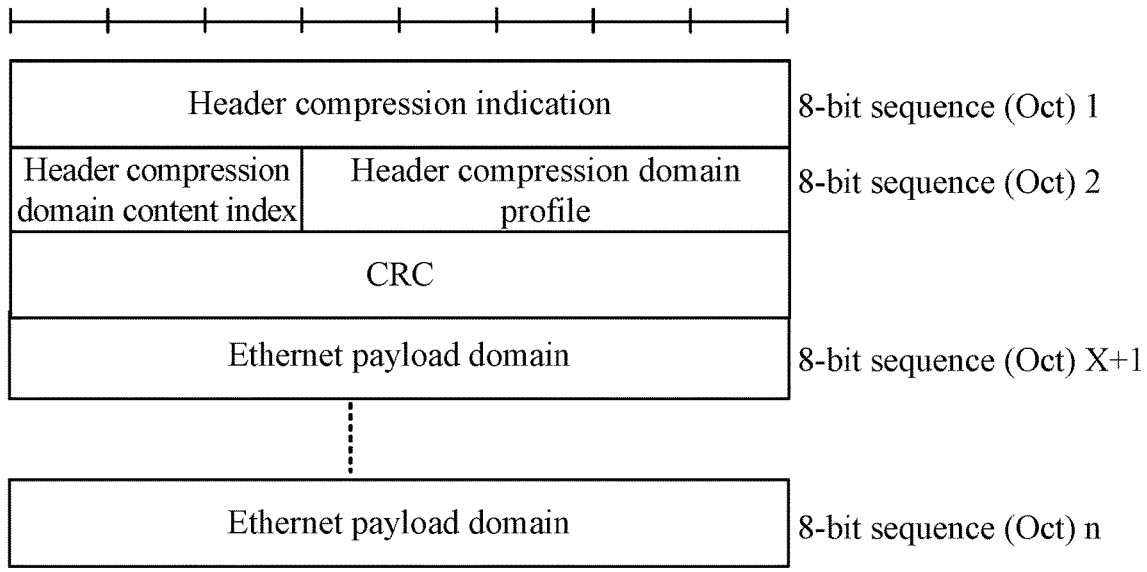
FIG. 9 is a structural diagram of a compressed frame of an Ethernet header according to an embodiment of the present disclosure.
Figure 10:
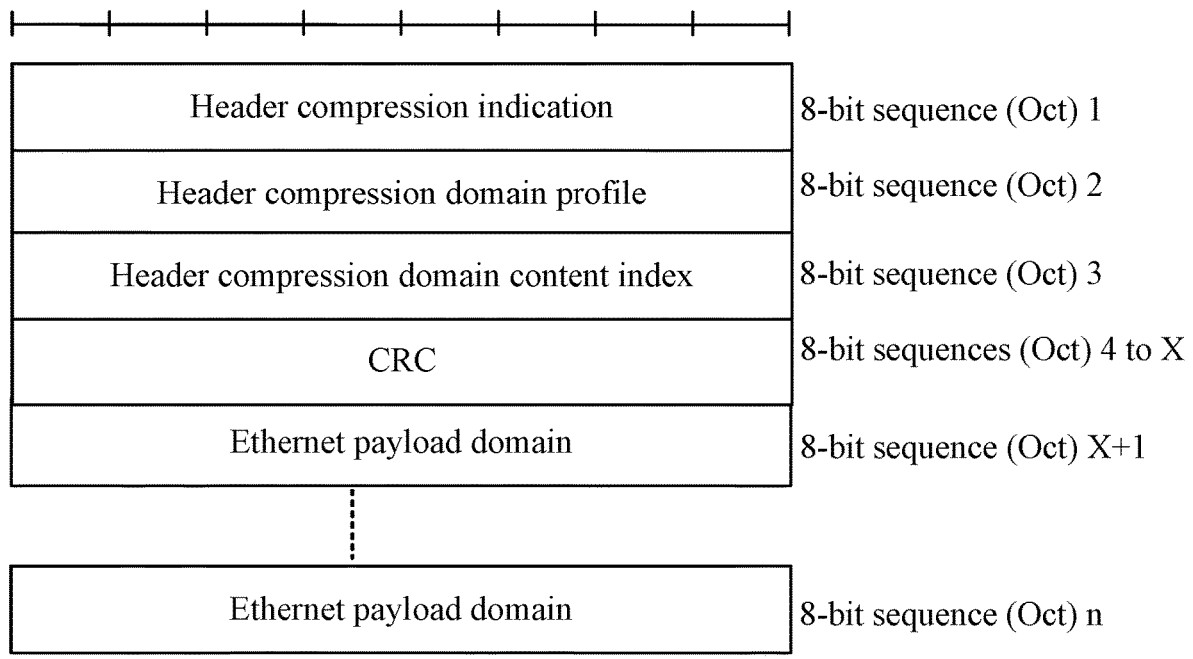
FIG. 10 is a structural diagram of another compressed frame of an Ethernet header according to an embodiment of the present disclosure.

FIG. 9 is a structural diagram of a compressed frame of an Ethernet header according to an embodiment of the present disclosure. FIG. 10 is a structural diagram of another compressed frame of an Ethernet header according to an embodiment of the present disclosure. As shown in FIG. 9 and FIG. 10, the structure of the compressed frame of the Ethernet header needs to include at least the following information: an Ethernet header compression indication (used for indicating a frame type: whether to compress, a compressed initial frame, and a compressed frame), an Ethernet header compression domain profile (used for indicating which frame headers are compressed), an Ethernet header compression domain content index (used for indicating a content index of a compressed frame header), cyclic redundancy check (CRC) bits, an Ethernet payload domain, an initial data frame indication of Ethernet header compression (including an Ethernet complete packet header), or a data frame indication of an Ethernet header compression state (a data frame after the packet header is compressed). The initial data frame indication of Ethernet header compression and the data frame of the Ethernet header compression state may be indirectly identified by the Ethernet header compression indication.

If the Ethernet header compression is at a user plane function (UPF) node and the UE node and the compression is performed in units of quality of service flow (QoS flow), the Ethernet header compression domain indication and the Ethernet header compression domain content index may not be carried.

If the Ethernet header compression is at the network side and the UE node, for the header compression of periodic traffic, when an eNB configures the CG or SPS, configuration information related to the Ethernet header compression is also carried.

There are currently 14 Ethernet header compression domain profiles or indexes. Considering the possible subsequent expansion of the frame structure, 5 bits (32 values in total) may be used for characterizing the Ethernet header compression domain profiles. Considering that the frame structure is aligned in units of bytes, the Ethernet frame header in the IIoT system is less likely to change, so 3 bits (8 values in total) are used for characterizing the Ethernet header compression content indexes. In addition, one byte is needed for identifying the header compression indication (indicating whether the Ethernet header is compressed). The CRC bits (1 to 4 bytes) are required to ensure the correctness of data decoding.

Considering the expansion of the frame structure and the expandability of variations of the Ethernet frame header in the IIoT system, the Ethernet header compression domain profiles may also be characterized by using 8 independent bits, and the Ethernet header compression content indexes may be characterized by using 8 independent bits.

The header compression indication is used for indicating: not performing the header compression; a header-compressed initial packet; and a data packet after the header compression.

Figure 11:
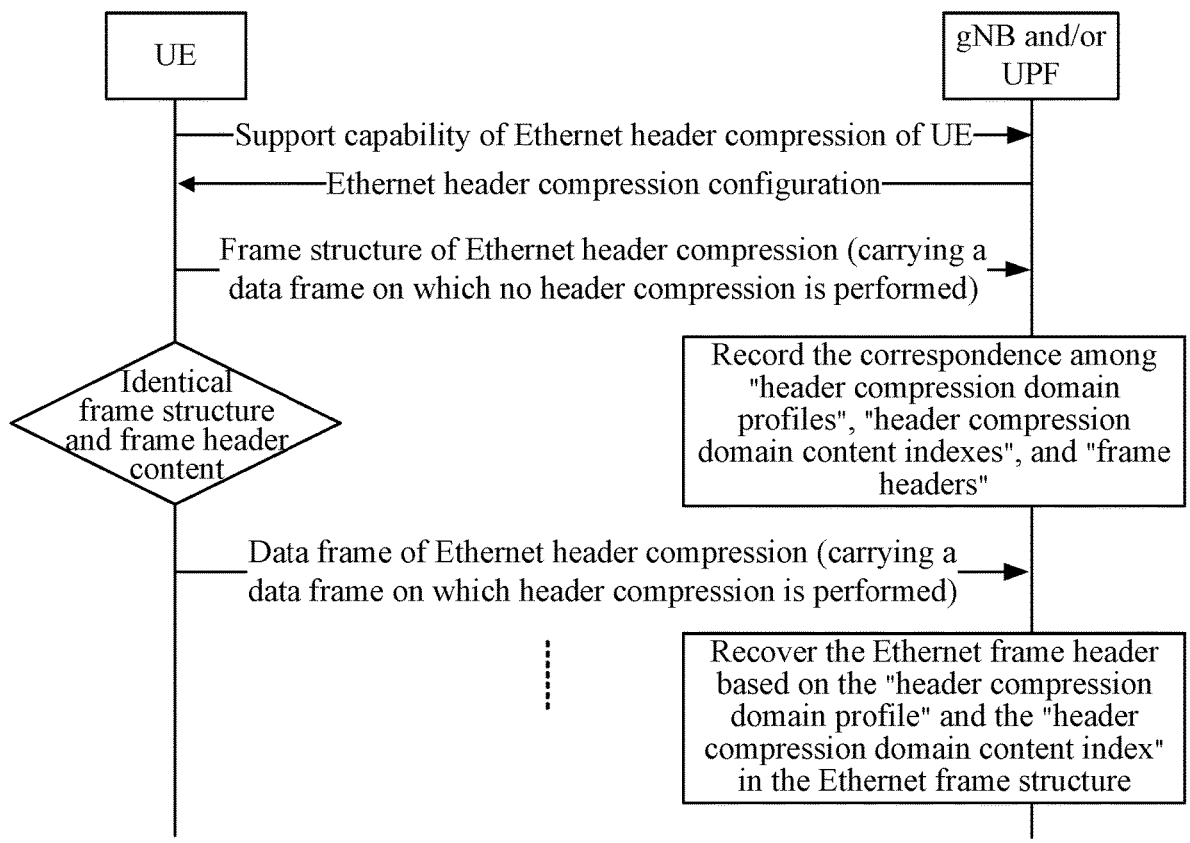
FIG. 11 is a schematic diagram of an Ethernet header compression flow according to an embodiment of the present disclosure.

FIG. 11 is a schematic diagram of an Ethernet header compression flow according to an embodiment of the present disclosure. As shown in FIG. 11, the Ethernet header compression flow includes the steps described below.

The UE sends a support capability of Ethernet header compression to an Ethernet header compression node (a network side or a user plane function (UPF)). The support capability at least includes the following information: whether to support the Ethernet header compression, a header compression domain profile supporting Ethernet (the compression of which headers is supported), and the supported maximum number of header compression domain content indexes. If the Ethernet header compression node is the network side, the support capability is sent through an RRC message reported by the UE capability. If the Ethernet header compression node is the UPF, the support capability is sent to the network side through the RRC message reported by the UE capability and then sent by the network side to the UPF, or the support capability is directly sent to the UPF through a non-access stratum (NAS) message.

The Ethernet header compression node (the network side or the UPF) configures a parameter related to the Ethernet header compression for the UE, where the parameter includes an Ethernet domain profile (list) that is capable of being compressed, and the maximum number of header compression domain content indexes that are capable of being used.

The UE sends an initial compressed data packet (carrying a complete Ethernet frame header) to the Ethernet header compression node, and the Ethernet header compression node records the correspondence among "header compression domain profiles", "header compression domain content indexes", and "frame headers".

When the UE finds that the frame header content of the newly sent data packet is consistent with the frame header content of the sent initial compressed data packet (carrying the complete Ethernet frame header), the UE sends a data frame (carrying a data frame after the header compression, the "header compression domain profile", and the "header compression domain content index") of the Ethernet header compression to the Ethernet header compression node.

The Ethernet header compression node recovers the Ethernet frame header based on the "header compression domain profile" and the "header compression domain content index" in the Ethernet frame structure and the stored information.

Figure 12:
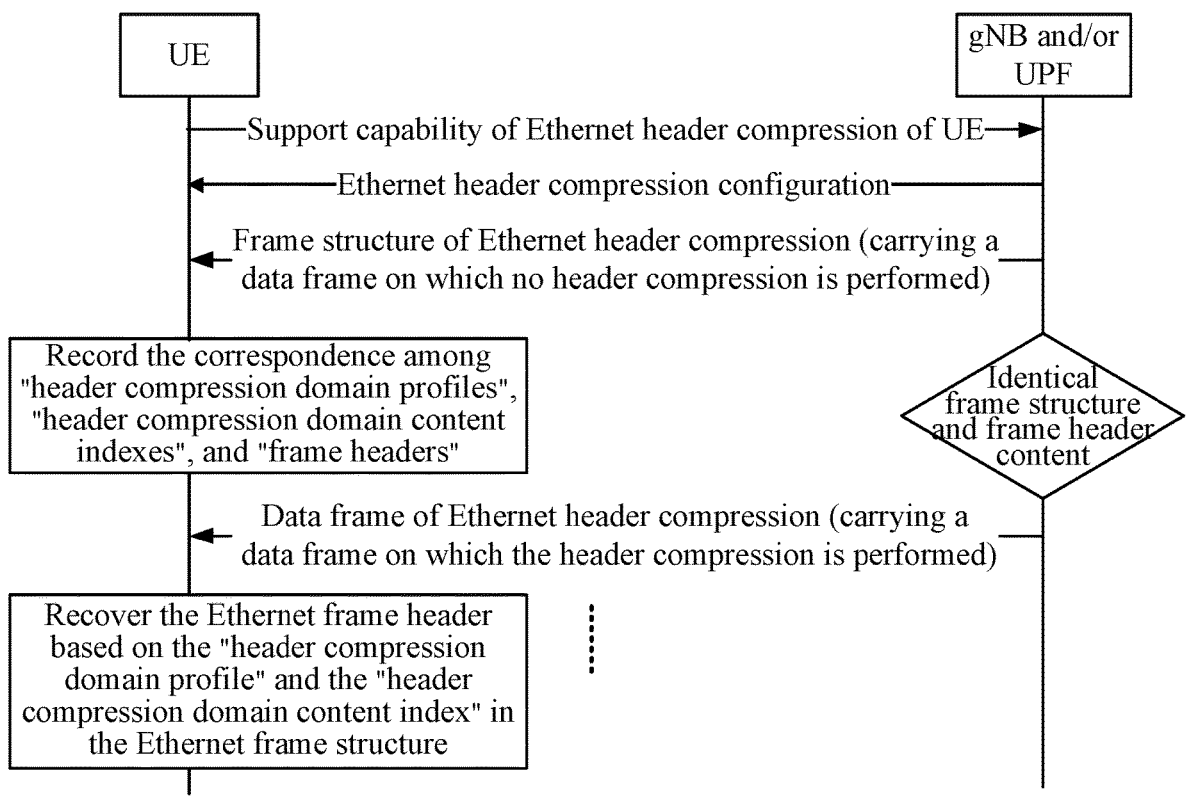
FIG. 12 is a schematic diagram of another Ethernet header compression flow according to an embodiment of the present disclosure.

The downlink Ethernet header compression process is similar to the above-mentioned flow. FIG. 12 is a schematic diagram of another Ethernet header compression flow according to an embodiment of the present disclosure. As shown in FIG. 12, the Ethernet header compression flow includes the steps described below.

The Ethernet header compression node sends an initial compressed data packet (carrying a complete Ethernet frame header) to the UE, and the Ethernet header compression node records the correspondence among "header compression domain profiles", "header compression domain content indexes", and "frame headers".

When the Ethernet header compression node finds that the frame header content of the newly sent data packet is consistent with the frame header content of the sent initial compressed data packet (carrying the complete Ethernet frame header), the Ethernet header compression node sends a data frame (carrying a data frame after the header compression, the "header compression domain profile", and the "header compression domain content index") of the Ethernet header compression to the UE.

The UE recovers the Ethernet frame header based on the "header compression domain profile" and the "header compression domain content index" in the Ethernet frame structure and the stored information.

Figure 13:
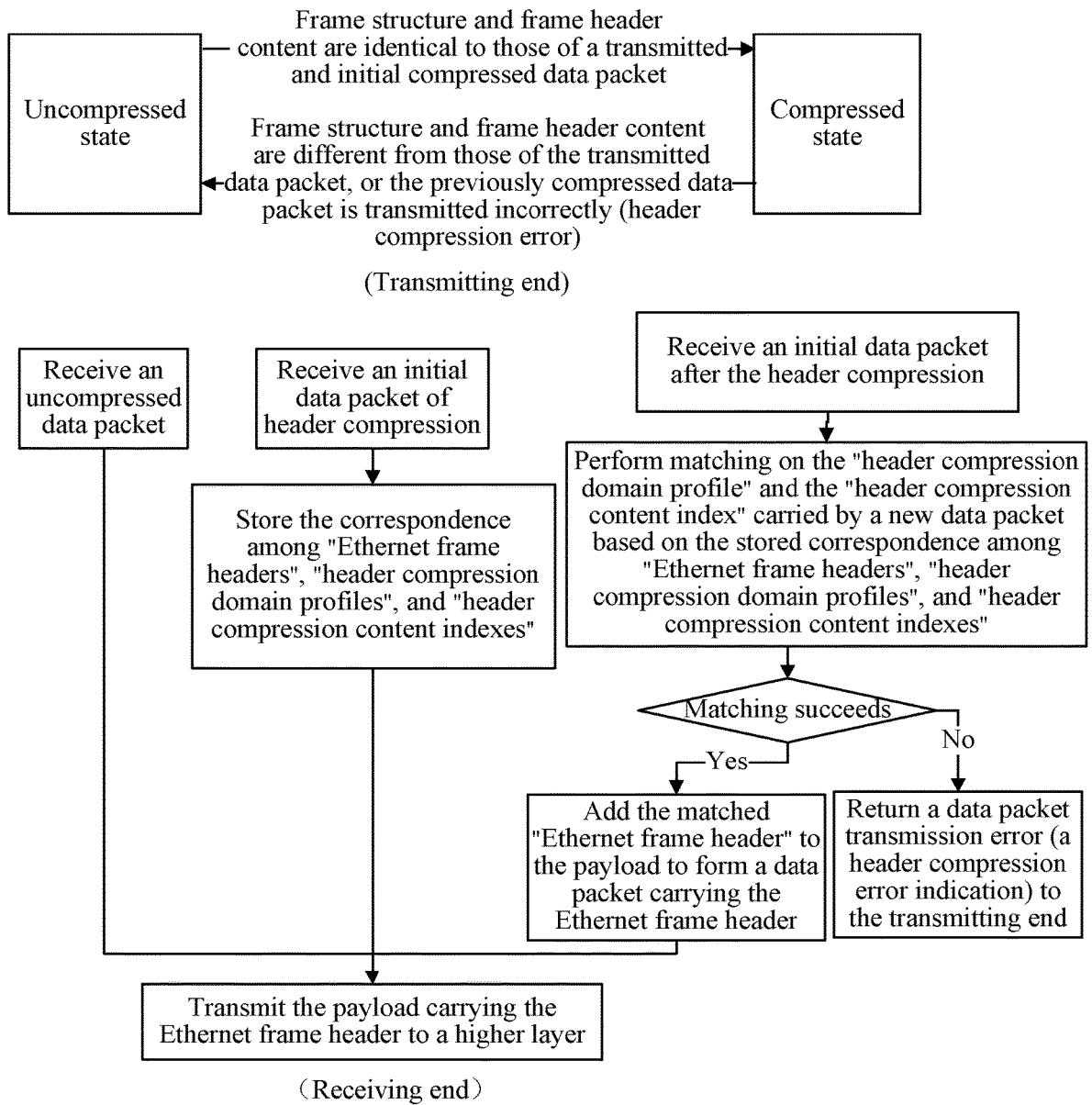
FIG. 13 is a schematic diagram of an Ethernet header compression state machine according to an embodiment of the present disclosure.

FIG. 13 is a schematic diagram of an Ethernet header compression state machine according to an embodiment of the present disclosure.

Transmitting end: when the transmitting end finds that the frame structure and the frame header content of a to-be-sent data packet are completely consistent with the frame structure and the frame header content of the transmitted initial compressed data packet, the transmitting end sends a data packet after the header compression and enters an Ethernet data packet compression state. When the transmitting end finds the frame structure and the frame header content of the to-be-sent data packet are different from the frame structure and the frame header content of the transmitted data packet (the frame structure and the frame header content have not been sent), or when the data packet previously compressed is transmitted incorrectly (a header compression error), the transmitting end sends a data packet including a frame header (an initial compressed data packet or an uncompressed data packet) and enters an Ethernet data packet uncompressed state.

Receiving End:

when the receiving end receives an uncompressed data packet, the receiving end transmits the data packet to a higher layer. When the receiving end receives a header-compressed initial data packet, the receiving end stores the correspondence among "Ethernet frame headers", "header compression domain profiles", and "header compression content indexes" and transmits the Ethernet data packet to the higher layer. When the receiving end receives the initial data packet after the header compression, the receiving end performs matching on the "header compression domain profile" and the "header compression content index" carried by the new data packet based on the stored correspondence among "Ethernet frame headers", "header compression domain profiles", and "header compression content indexes". If the matching is successful, the receiving end adds the matched "Ethernet frame header" to the payload to form a data packet carrying the Ethernet frame header and transmits the data packet carrying the Ethernet frame header to the higher layer; otherwise, the receiving end returns a data packet transmission error (a header compression error indication) to the transmitting end. The header compression error indication may be indicated through a predefined feedback frame structure, a MAC CE, NAS signaling, or the like.

From the description of the embodiments described above, it will be apparent to those skilled in the art that the method in the embodiments described above may be implemented by means of software plus a necessary general-purpose hardware platform, or may of course be implemented by hardware. The solution of the present disclosure may be embodied in the form of a software product. The computer software product is stored in a storage medium (such as a ROM/RAM, a magnetic disk or an optical disk) and includes several instructions for enabling a terminal device (which may be a mobile phone, a computer, a server, a network device or the like) to execute the method in each of the embodiments described above.

Embodiment Five

Figure 14:
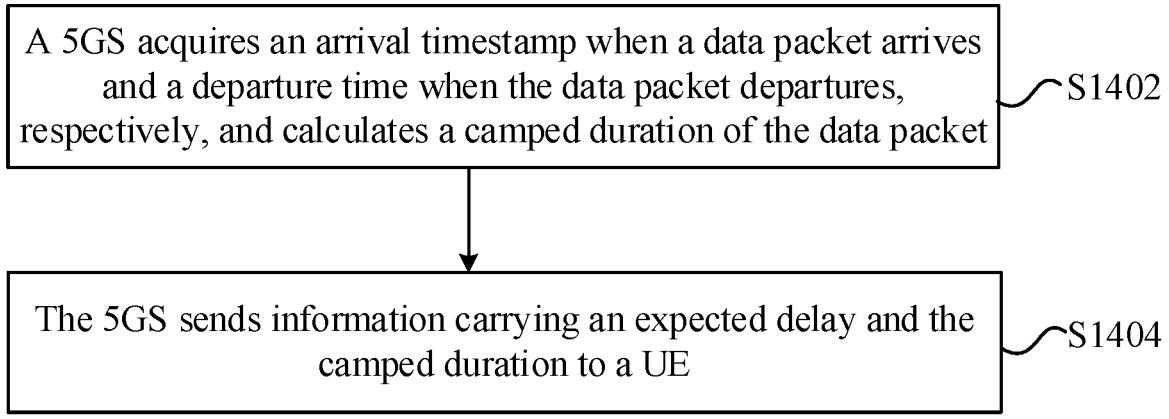
FIG. 14 is a flowchart of an Ethernet instruction coordination method according to an embodiment of the present disclosure.

This embodiment provides an Ethernet instruction coordination method. FIG. 14 is a flowchart of an Ethernet instruction coordination method according to an embodiment of the present disclosure. As shown in FIG. 14, the method includes the steps described below.

In step S1402, a 5GS acquires an arrival timestamp when a data packet arrives and a departure time when the data packet departures, respectively, and calculates a camped duration of the data packet.

In step S1404, the 5GS sends information carrying an instruction of a validation delay and the camped duration to a UE.

Optionally, the step in which the 5GS sends the information carrying the instruction of the validation delay and the camped duration to the UE includes the following step: the 5GS calculates a difference between the validation delay and the camped duration and updates the instruction according to the difference.

Optionally, the step in which the 5GS sends the information carrying the instruction of the validation delay and the camped duration to the UE includes the following step: the 5GS adds the camped duration into the data packet and instructs the UE to update the validation delay according to the camped duration and the validation delay.

Optionally, the step in which the 5GS sends the information carrying the instruction of the validation delay and the camped duration to the UE includes the following step: the 5GS accumulates the camped duration to a camped duration in the data packet and instructs the UE to update the validation delay according to the accumulated camped duration in the data packet and the validation delay.

Figure 15:
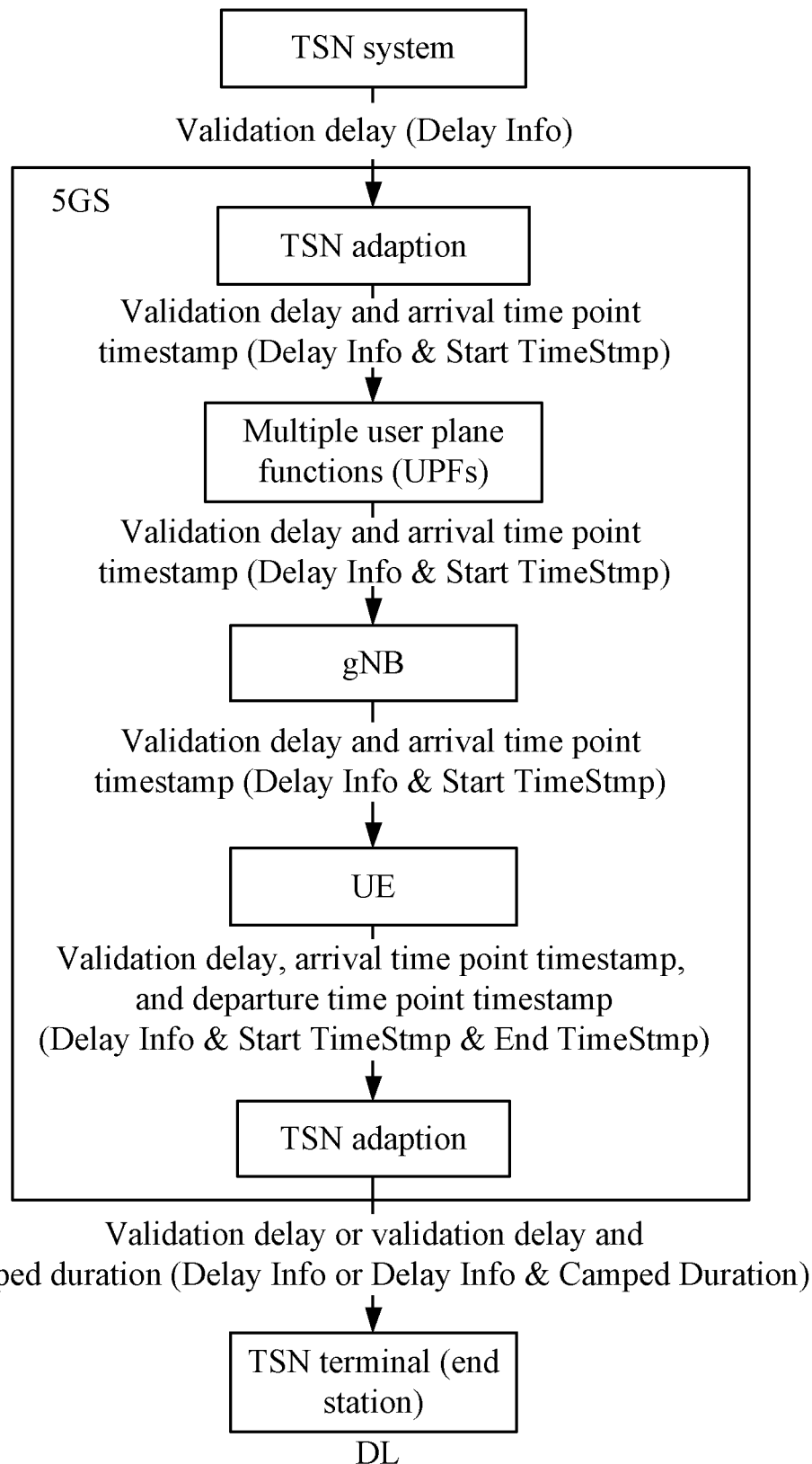
FIG. 15 is a flowchart of Ethernet instruction coordination according to an embodiment of the present disclosure.

FIG. 15 is a schematic diagram of an Ethernet instruction coordination flow according to an embodiment of the present disclosure. As shown in FIG. 15, the Ethernet instruction coordination flow includes the steps described below. When an instruction is sent to an Ethernet terminal, the validation delay of the instruction (for example, how long does the instruction take effect from the moment when the instruction is sent) is also carried at the same time. When the data packet arrives at the 5GS, the arrival time point timestamp (5GS Start timestamp) is added into the data packet by the Ethernet adaption node of the 5GS. When the data packet is transmitted through the 5GS and leaves the 5GS, a duration of the data packet transmitted in the 5GS is calculated by the Ethernet adaptation node of the 5GS based on the arrival time point timestamp of the data packet and a current time point, and the duration is used as a transmission duration or the camped duration of the data packet in the 5GS.

The transmission duration or the camped duration of the data packet in the 5GS may also include that: a "transmitted duration of the data packet" is also carried in the process where the data packet is transmitted between communication nodes of the 5GS; and when the data arrives at a certain communication node, this node records the camped duration of the data packet in this node, accumulates the camped duration to the "transmitted duration of the data packet", and transmits the accumulated "transmitted duration of the data packet" to a next communication node. The "transmitted duration of the data packet" received by the last communication node of the 5GS is the transmission duration or the camped duration of the data packet in the 5GS.

The Ethernet adaption node of the 5GS subtracts the camped duration of the data packet in the 5GS from the validation delay of the instruction to be the validation delay of the instruction, and transmits the validation delay of the instruction to the Ethernet terminal.

Alternatively, the Ethernet adaption node of the 5GS adds the camped duration of the data packet in the NR system to the Ethernet data packet and transmits to the Ethernet terminal, and the Ethernet terminal calculates the validation delay of the instruction (how long does the instruction take effect from the moment when the instruction is received) based on the validation delay of the instruction and the camping delay in the transmission nodes.

Alternatively, the Ethernet adaption node of the 5GS accumulates the camped duration to the camped duration of the Ethernet data packet and transmits to the Ethernet terminal, and the Ethernet terminal calculates the validation delay of the instruction (how long does the instruction take effect from the moment when the instruction is received) based on the validation delay of the instruction and the camped duration in the Ethernet data packet.

Figure 16:
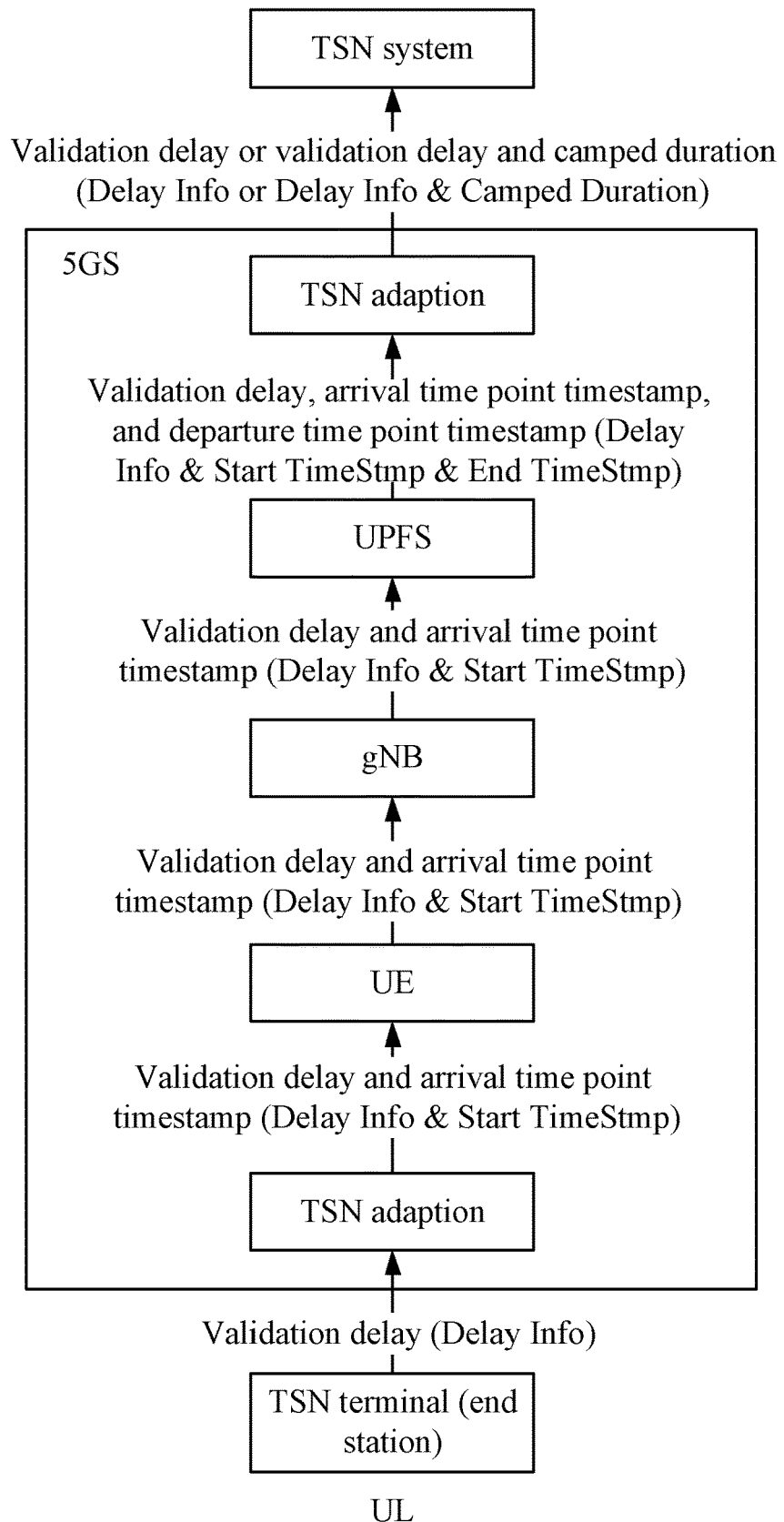
FIG. 16 is another flowchart of Ethernet instruction coordination according to an embodiment of the present disclosure.

The uplink data transmission is similar to the above-mentioned flow. FIG. 16 is a schematic diagram of another Ethernet instruction coordination flow according to an embodiment of the present disclosure. As shown in FIG. 16, when a transmission sequence number (TSN) terminal sends data carrying an expected validation delay of an instruction. When the data packet enters the 5GS, a start timestamp is added. The camped duration in the 5GS is calculated based on the start timestamp and a current time when the data packet leaves the 5GS. The camping delay is subtracted from the expected validation delay of the instruction, and the result is sent to the next node as the expected validation delay of the instruction; or the camped duration is sent to the next node; or the camped duration is accumulated to the camped duration in the Ethernet packet and transmitted to the next node.

From the description of the embodiments described above, it will be apparent to those skilled in the art that the method in the embodiments described above may be implemented by means of software plus a necessary general-purpose hardware platform, or may of course be implemented by hardware. The solution of the present disclosure may be embodied in the form of a software product. The computer software product is stored in a storage medium (such as a ROM/RAM, a magnetic disk or an optical disk) and includes several instructions for enabling a terminal device (which may be a mobile phone, a computer, a server, a network device or the like) to execute the method in each of the embodiments described above.

Embodiment Six

This embodiment further provides a resource periodicity configuration device. The device is used for implementing the above-mentioned embodiments and alternative embodiments. What has been described will not be repeated. As used below, the term "module" may be software, hardware or a combination of software and hardware capable of implementing predetermined functions. The device described below in this embodiment is implemented by software, but implementation by hardware or by a combination of software and hardware is also possible and conceived.

Figure 17:
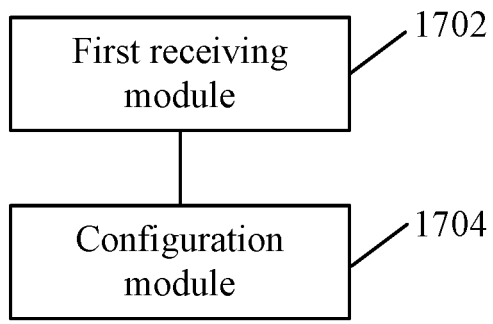
FIG. 17 is a structural block diagram of a resource periodicity configuration device according to an embodiment of the present disclosure.

FIG. 17 is a structural block diagram of a resource periodicity configuration device according to an embodiment of the present disclosure. As shown in FIG. 17, the device is located on the network side and includes a first receiving module 1702 and a configuration module 1704.

The first receiving module 1702 is configured to receive a traffic mode and/or a clock accuracy capability reported by a UE.

The configuration module 1704 is configured to send resource configuration information to the UE. The resource configuration information carries at least one of: a periodicity factor of a configuration resource, a periodicity granularity of the configuration resource, or a periodicity length of the configuration resource; and the configuration information is used for configuring a resource related to SPS or CG of the UE.

It is to be noted that the various modules described above may be implemented by software or hardware. An implementation by hardware may, but may not necessarily, be performed in the following manners: the various modules described above are located in the same processor, or the various modules described above are located in their respective processors in any combination form.

Embodiment Seven

This embodiment further provides a link path processing device. The device is used for implementing the above-mentioned embodiments and alternative embodiments. What has been described will not be repeated. As used below, the term "module" may be software, hardware or a combination of software and hardware capable of implementing predetermined functions. The device described below in this embodiment is implemented by software, but implementation by hardware or by a combination of software and hardware is also possible and conceived.

Figure 18:
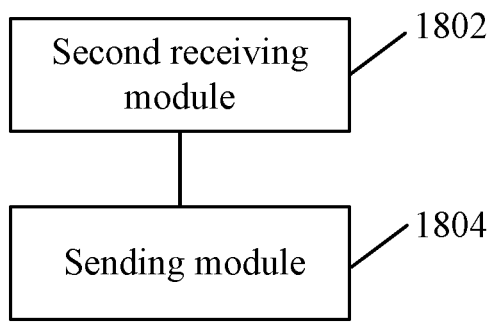
FIG. 18 is a structural block diagram of a link path processing device according to an embodiment of the present disclosure.

FIG. 18 is a structural block diagram of a link path processing device according to an embodiment of the present disclosure. As shown in FIG. 18, the device is located on the network side and includes a second receiving module 1802 and a sending module 1804.

The second receiving module 1802 is configured to send a resource configuration request for requesting resource configuration information to a target cell and receive a resource configuration response fed back by the target cell.

The sending module 1804 is configured to send a target cell link addition request for establishing a link path between the UE and the target cell to a UE. The target cell link addition request carries the resource configuration information, the resource configuration information carries at least one of: a periodicity factor of a configuration resource, a periodicity granularity of the configuration resource, or a periodicity length of the configuration resource, and the configuration information is used for configuring a resource related to SPS or CG of the UE.

It is to be noted that the various modules described above may be implemented by software or hardware. An implementation by hardware may, but may not necessarily, be performed in the following manners: the various modules described above are located in the same processor, or the various modules described above are located in their respective processors in any combination form.

Embodiment Eight

This embodiment further provides a link path establishing device. The device is used for implementing the above-mentioned embodiments and alternative embodiments. What has been described will not be repeated. As used below, the term "module" may be software, hardware or a combination of software and hardware capable of implementing predetermined functions. The device described below in this embodiment is implemented by software, but implementation by hardware or by a combination of software and hardware is also possible and conceived.

Figure 19:
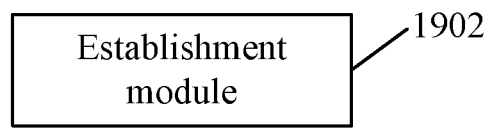
FIG. 19 is a structural block diagram of a link path establishing device according to an embodiment of the present disclosure.

FIG. 19 is a structural block diagram of a link path establishing device according to an embodiment of the present disclosure. As shown in FIG. 19, the device is located in a UE and includes an establishment module 1902.

The establishment module 1902 is configured to receive a target cell link addition request sent by a source cell and establish a link path with a target cell. The target cell link addition request carries resource configuration information, the resource configuration information is acquired by sending a resource configuration request from the source cell to the target cell, the resource configuration information carries at least one of: a periodicity factor of a configuration resource, a periodicity granularity of the configuration resource, or a periodicity length of the configuration resource, and the resource configuration information is used for indicating SPS traffic or CG traffic of the UE. The configuration information is used for indicating SPS traffic or CG traffic of the UE.

It is to be noted that the various modules described above may be implemented by software or hardware. An implementation by hardware may, but may not necessarily, be performed in the following manners: the various modules described above are located in the same processor, or the various modules described above are located in their respective processors in any combination form.

Embodiment Nine

This embodiment further provides a device for compressing a frame header of an Ethernet frame. The device is used for implementing the above-mentioned embodiments and alternative embodiments. What has been described will not be repeated. As used below, the term "module" may be software, hardware or a combination of software and hardware capable of implementing predetermined functions. The device described below in this embodiment is implemented by software, but implementation by hardware or by a combination of software and hardware is also possible and conceived.

Figure 20:
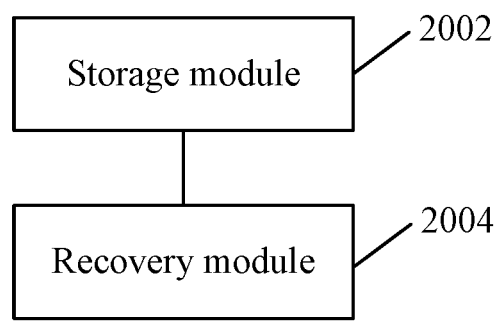
FIG. 20 is a structural block diagram of a device for compressing a frame header of an Ethernet frame according to an embodiment of the present disclosure.

FIG. 20 is a structural block diagram of a device for compressing a frame header of an Ethernet frame according to an embodiment of the present disclosure. As shown in FIG. 20, the device is located in a second communication node and includes a storage module 2002 and a recovery module 2004.

The storage module 2002 is configured to receive by the second communication node a first compressed data packet carrying a first Ethernet frame and sent by a first communication node and receive correspondence information between header compression domain information and a frame header of the first Ethernet frame.

The recovery module 2004 is configured to receive a second compressed data packet carrying a second Ethernet frame and sent by the first communication node and recover a frame header of the second Ethernet frame according to header compression domain information in the second Ethernet frame and the received correspondence information between the header compression domain information and the frame header of the first Ethernet frame. The first Ethernet frame is an Ethernet frame on which no header compression is performed, and the second Ethernet frame is an Ethernet frame on which header compression is performed; and the header compression domain information includes a header compression domain profile and/or a header compression domain content index.

Embodiment Ten

This embodiment further provides an Ethernet instruction coordination device. The device is used for implementing the above-mentioned embodiments and alternative embodiments. What has been described will not be repeated. As used below, the term "module" may be software, hardware or a combination of software and hardware capable of implementing predetermined functions. The device described below in this embodiment is implemented by software, but implementation by hardware or by a combination of software and hardware is also possible and conceived.

Figure 21:
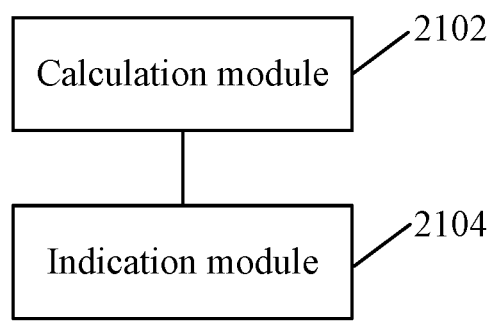
FIG. 21 is a structural block diagram of an Ethernet instruction coordination device according to an embodiment of the present disclosure.

FIG. 21 is a structural block diagram of an Ethernet instruction coordination device according to an embodiment of the present disclosure. As shown in FIG. 21, the device is located in a 5GS and includes a calculation module 2102 and an indication module 2104.

The calculation module 2102 is configured to acquire an arrival timestamp when a data packet arrives and a departure time when the data packet departures, respectively, and calculate a camped duration of the data packet.

The indication module 2104 is configured to send information carrying an instruction of a validation delay and the camped duration to a UE.

Embodiment Eleven

An embodiment of the present disclosure further provides a storage medium. The storage medium is configured to store a computer program which is configured to, when executed, perform steps in any one of the method embodiments described above.

Optionally, in this embodiment, the above-mentioned storage medium may be configured to store the method for performing any one of the embodiments described above.

Optionally, in this embodiment, the above-mentioned storage medium may include, but is not limited to, a universal serial bus (USB) flash disk, a read-only memory (ROM), a random access memory (RAM), a mobile hard disk, a magnetic disk, an optical disk or another medium capable of storing computer programs.

This embodiment further provides an electronic device. The electronic device includes a memory and a processor. The memory is configured to store a computer program. The processor is configured to execute the computer program to perform the steps in any one of the method embodiments described above.

Optionally, the electronic device may further include a transmission device and an input/output device. Both the transmission device and the input/output device are connected to the processor.

Optionally, in this embodiment, the above-mentioned processor may be configured to perform any one of the methods in the embodiments described above.

Optionally, for specific examples in this embodiment, reference may be made to the examples described in the preceding embodiments and alternative embodiments, which will not be repeated in this embodiment.

Apparently, it is to be understood by those skilled in the art that the modules or steps of the present disclosure may be implemented by a general-purpose computing apparatus and may be concentrated on a single computing apparatus or distributed in a network formed by multiple computing apparatuses. Alternatively, these modules or steps may be implemented by program codes executable by the computing apparatus. Thus, these modules or steps may be stored in a storage apparatus and executed by the computing apparatus. Moreover, in some cases, the illustrated or described steps may be executed in a sequence different from the sequence described herein. Alternatively, each of these modules or steps may be implemented by being made into an integrated circuit module or multiple modules or steps among these modules or steps may be implemented by being made into a single integrated circuit module. In this manner, the present disclosure is not limited to any specific combination of hardware and software.

We claim:

1. A method for compressing a frame header of an Ethernet frame, comprising:
   receiving, by a second communication node, a first data packet carrying a first Ethernet frame from a first communication node, and correspondence information between header compression domain information in the first Ethernet frame and a frame header of the first Ethernet frame;
   receiving, by the second communication node, a second data packet carrying a second Ethernet frame from the first communication node; and
   recovering, according to header compression domain information in the second Ethernet frame and the correspondence information between the header compression domain information in the first Ethernet frame and the frame header of the first Ethernet frame, a frame header of the second Ethernet frame,
   wherein the first Ethernet frame is an Ethernet frame on which no Ethernet header compression is performed, the second Ethernet frame is an Ethernet frame on which Ethernet header compression is performed, and the header compression domain information in the first Ethernet frame and the header compression domain information in the second Ethernet frame each comprises a respective header compression domain content index for identifying content of a compressed Ethernet frame header, and a respective header compression domain profile.

2. The method of claim 1, wherein recovering, according to the header compression domain information in the second Ethernet frame and the correspondence information between the header compression domain information in the first Ethernet frame and the frame header of the first Ethernet frame, the frame header of the second Ethernet frame, comprises:
   matching, by the second communication node, the header compression domain information in the first Ethernet frame of the correspondence information, with the header compression domain information in the second Ethernet frame.

3. The method of claim 1, wherein when the first communication node is a user equipment (UE), the second communication node is a network side node; and when the first communication node is a network side node, the second communication node is a UE.

4. The method of claim 3, wherein further comprising:
   sending, by the UE to the network side node, a support capability of Ethernet header compression, and receiving, by the UE from the network side node, a parameter of the Ethernet header compression;
   wherein the support capability of the Ethernet header compression comprises at least one of: whether to support the Ethernet header compression, or header compression domain information supporting Ethernet; and
   wherein the parameter of the Ethernet header compression comprises header compression domain information for allowing compression.

5. The method of claim 1, wherein the header compression domain profile indicates:
   compressing a destination address and a source address of Ethernet in the Ethernet frame; and
   compressing a frame header of an Ethernet frame containing an 802.1Q tag domain.

6. A second communication node, comprising:
   a transceiver configured to:
   receive a first data packet carrying a first Ethernet frame from a first communication node, and correspondence information between header compression domain information in the first Ethernet frame and a frame header of the first Ethernet frame;
   receive a second data packet carrying a second Ethernet frame from the first communication node; and
   at least one processor configured to:
   recover, according to header compression domain information in the second Ethernet frame and the correspondence information between the header compression domain information in the first Ethernet frame and the frame header of the first Ethernet frame, a frame header of the second Ethernet frame,
   wherein the first Ethernet frame is an Ethernet frame on which no Ethernet header compression is performed, the second Ethernet frame is an Ethernet frame on which Ethernet header compression is performed, and the header compression domain information in the first Ethernet frame and the header compression domain information in the second Ethernet frame each comprises a respective header compression domain content index for identifying content of a compressed Ethernet frame header, and a respective header compression domain profile.

7. The second communication node of claim 6, wherein the at least one processor is configured to recover the frame header of the second Ethernet frame by:
   matching the header compression domain information in the correspondence information, with the header compression domain information in the second Ethernet frame; and
   if the matching succeeds, reporting the frame header of the second Ethernet frame to a higher layer.

8. The second communication node of claim 6, wherein the at least one processor is further configured to:

send via the transceiver, to a network side node, a support capability of Ethernet header compression, and receive, from the network side node, a parameter of the Ethernet header compression, wherein the support capability of the Ethernet header compression comprises at least one of: whether to support the Ethernet header compression, or header compression domain information supporting Ethernet; and wherein the parameter of the Ethernet header compression comprises header compression domain information for allowing compression.

9. The second communication node of claim 6, wherein the header compression domain profile indicates:

compressing a destination address and a source address of Ethernet in the Ethernet frame; and compressing a frame header of an Ethernet frame containing an 802.1Q tag domain.

10. A method for compressing a frame header of an Ethernet frame, comprising:

sending, by a first communication node to a second communication node, a first data packet carrying a first Ethernet frame, and correspondence information between header compression domain information in the first Ethernet frame and a frame header of the first Ethernet frame; and sending, by the first communication node to the second communication node, a second data packet carrying a second Ethernet frame, wherein a frame header of the second Ethernet frame is recovered according to header compression domain information in the second Ethernet frame and the correspondence information between the header compression domain information in the first Ethernet frame and the frame header of the first Ethernet frame, and wherein the first Ethernet frame is an Ethernet frame on which no Ethernet header compression is performed, the second Ethernet frame is an Ethernet frame on which Ethernet header compression is performed, and the header compression domain information in the first Ethernet frame and the header compression domain information in the second Ethernet frame each comprises a respective header compression domain content index for identifying content of a compressed Ethernet frame header, and a respective header compression domain profile.

11. The method of claim 10, wherein the frame header of the second Ethernet frame is recovered by:

matching the header compression domain information in the first Ethernet frame of the correspondence information, with the header compression domain information in the second Ethernet frame.

12. The method of claim 10, wherein when the first communication node is a user equipment (UE), the second communication node is a network side node; and when the first communication node is a network side node, the second communication node is a UE.

13. The method of claim 12, further comprising:

receiving, by the network side node from the UE, a support capability of Ethernet header compression, and sending, by the network side node to the UE, a parameter of the Ethernet header compression, wherein the support capability of the Ethernet header compression comprises at least one of: whether to support the Ethernet header compression, or header compression domain information supporting Ethernet; and wherein the parameter of the Ethernet header compression comprises header compression domain information for allowing compression.

14. The method of claim 10, wherein the header compression domain profile indicates:

compressing a destination address and a source address of Ethernet in the Ethernet frame; and compressing a frame header of an Ethernet frame containing an 802.1Q tag domain.

15. A first communication node comprising:

a transceiver configured to:

send, to a second communication node, a first data packet carrying a first Ethernet frame, and correspondence information between header compression domain information in the first Ethernet frame and a frame header of the first Ethernet frame; and send, to the second communication node, a second data packet carrying a second Ethernet frame, wherein a frame header of the second Ethernet frame is recovered according to header compression domain information in the second Ethernet frame and the correspondence information between the header compression domain information in the first Ethernet frame and the frame header of the first Ethernet frame, and wherein the first Ethernet frame is an Ethernet frame on which no Ethernet header compression is performed, the second Ethernet frame is an Ethernet frame on which Ethernet header compression is performed, and the header compression domain information in the first Ethernet frame and the header compression domain information in the second Ethernet frame each comprises a respective header compression domain content index for identifying content of a compressed Ethernet frame header, and a respective header compression domain profile.

16. The method of claim 1, wherein the header compression domain profile indicates:

not compressing a frame header of the Ethernet frame.

17. The second communication node of claim 6, wherein the header compression domain profile indicates:

not compressing a frame header of the Ethernet frame.

18. The method of claim 10, wherein the header compression domain profile indicates:

not compressing a frame header of the Ethernet frame.

* * * * *